United States Patent
Bowman et al.

(10) Patent No.: US 10,156,652 B2
(45) Date of Patent: Dec. 18, 2018

(54) OFFSET FOOTPRINT ANALYSIS FOR SELECTING CANDIDATE LINES FOR SEISMIC SURVEY

(71) Applicant: ION GEOPHYSICAL CORPORATION, Houston, TX (US)

(72) Inventors: David Robert Bowman, Edinburgh (GB); Michael Bernard Tomlinson, Halbeath (GB); Angus Macgregor Styles, Edinburgh (GB)

(73) Assignee: ION Geophysical Corporation, Houston, TX (US)

( * ) Notice: Subject to any disclaimer, the term of this patent is extended or adjusted under 35 U.S.C. 154(b) by 23 days.

(21) Appl. No.: 14/790,795

(22) Filed: Jul. 2, 2015

(65) Prior Publication Data
US 2016/0003959 A1 Jan. 7, 2016

Related U.S. Application Data

(60) Provisional application No. 62/021,040, filed on Jul. 4, 2014.

(51) Int. Cl.
*G01V 1/38* (2006.01)
*G01V 1/00* (2006.01)

(52) U.S. Cl.
CPC ............ *G01V 1/3808* (2013.01); *G01V 1/003* (2013.01); *G01V 2200/14* (2013.01)

(58) Field of Classification Search
CPC ... G01V 1/3808; G01V 1/003; G01V 2200/14
USPC ......................................................... 367/15
See application file for complete search history.

(56) References Cited

U.S. PATENT DOCUMENTS

| | | |
|---|---|---|
| 4,759,636 A | 7/1988 | Ahern et al. |
| 5,790,472 A | 8/1998 | Workman |
| 5,920,828 A | 7/1999 | Norris |
| 6,148,264 A | 11/2000 | Houck |
| 6,182,014 B1 | 1/2001 | Kenyon |
| 6,311,131 B1 | 10/2001 | Peardon |
| 7,400,552 B2 | 7/2008 | Moldoveanu |
| 7,778,109 B2 | 8/2010 | Storteig |
| 8,520,468 B2 | 8/2013 | Seale et al. |
| 2003/0012083 A1 | 1/2003 | Brunet |
| 2003/0193837 A1 | 10/2003 | Rommel |
| 2004/0230379 A1 | 3/2004 | Houck |
| 2004/0125697 A1 | 7/2004 | Fleming |

(Continued)

FOREIGN PATENT DOCUMENTS

WO 00/54074 9/2000

OTHER PUBLICATIONS

Burnham, M. et al., "Optimizing 4D Repeatability with Enhanced Acquisition Technologies," ION Marine Imaging Systems, pp. 1-4, © 2007.

(Continued)

*Primary Examiner* — Daniel L Murphy
(74) *Attorney, Agent, or Firm* — Blank Rome LLP

(57) ABSTRACT

An analysis is proved to determine a candidate line for at least one vessel to traverse in a 3D seismic survey to achieve desired coverage either along a planned line or a new infill line. The analysis can also be used in a 4-D survey to determine the coverage of a candidate line relative to the baseline survey previously conducted. The analysis determines a coverage footprint of the common midpoint lines, at given offsets, so the user or automated system can select a candidate line to achieve the best coverage.

26 Claims, 15 Drawing Sheets

(56) References Cited

U.S. PATENT DOCUMENTS

| | | |
|---|---|---|
| 2004/0008175 A1 | 11/2004 | Elder |
| 2005/0060097 A1 | 3/2005 | Pramik |
| 2006/0268662 A1 | 11/2006 | Rekdal |
| 2010/0002537 A1 | 1/2010 | Welker |
| 2011/0286302 A1 | 11/2011 | Welker et al. |
| 2012/0300583 A1 | 11/2012 | Flynn et al. |
| 2013/0261980 A1 | 10/2013 | Rentsch-Smith et al. |

OTHER PUBLICATIONS

Gedco, "OMNI 3D® Layout Tutorial: Basic Streamer," Basic Streamer Tutorial: Apr. 2012, pp. 1-13.

Ion Geophysical Corporation, "Optimizing 4D Marine Seismic Acquisition," undated, obtained from www.iongeo.com on Jun. 30, 2014.

Ion Concept Systems, "MESA® 13: Acquisition Survey Design and 3D Modeling Software," undated, obtained from www.iongeo.com on Jun. 30, 2014.

Ion Geophysical Corporation, "Reflex: Comprehensive Binning and Attribute Analysis," copyright 2011.

Ion Concept Systems, "Ion Products: Marine Acquisition Services," undated, obtained from www.iongeo.com on Jun. 30, 2014.

Ion Concept Systems, "Spectra: Integrated Navigation System for Marine Geophysical Survey," undated, obtained from www.iongeo.com on Jun. 30, 2014.

Fromyr, E. et al., "Offset and Azimuth Diversity a Recipe for Complex Imaging," The Geological Society, Jan. 25, 2011.

Ion Geophysical Corporation, "4D Baseline Planning & Acquisition," copyright 2011.

Patenall, R. et al., "Reducing footprint and increasing coverage using modern seismic acquisition techniques—A New Zealand case study," undated, obtained from www.nzpam.govt.nz on Jun. 30, 2014.

Patenall, R. et al., "Reducing footprint and increasing coverage using modern seismic acquisition techniques—A New Zealand case study," Advantage NZ: Geotechnical Petroleum Forum 2014.

International Search Report and Written Opinion received in corresponding PCT application No. PCT/US2015/039055 dated Oct. 22, 2015.

First Office Action in counterpart CA Appl. 2,954,260, dated Nov. 15, 2017, 6-pgs.

First Office Action in counterpart DK Appl. PA 2017 70066, dated Oct. 30, 2017, 9-pgs.

Second Examination Report in counterpart DK Appl PA201770066, dated Oct. 12, 2018, 6-pgs.

(Background)

(Background)

(Background)

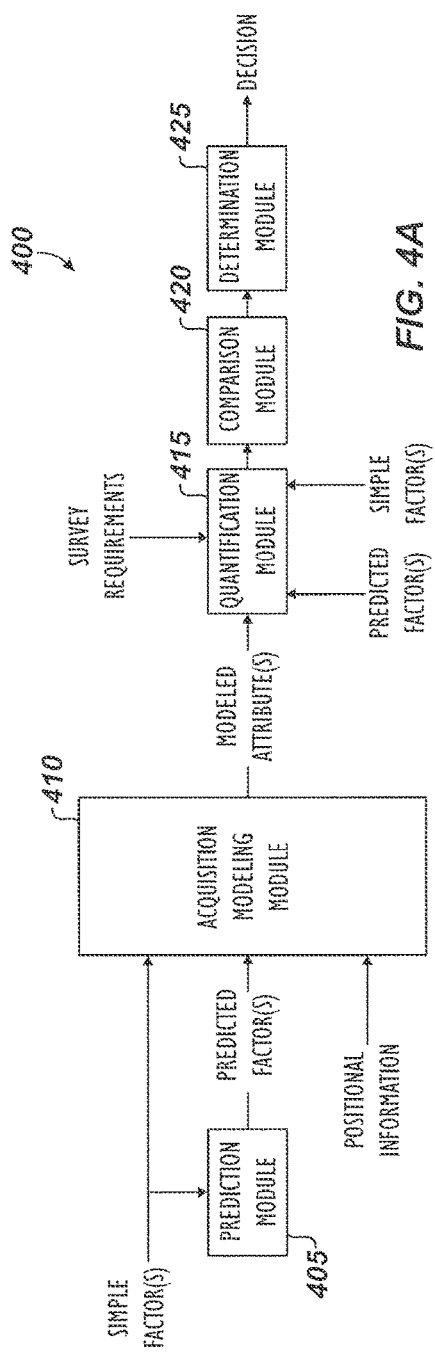
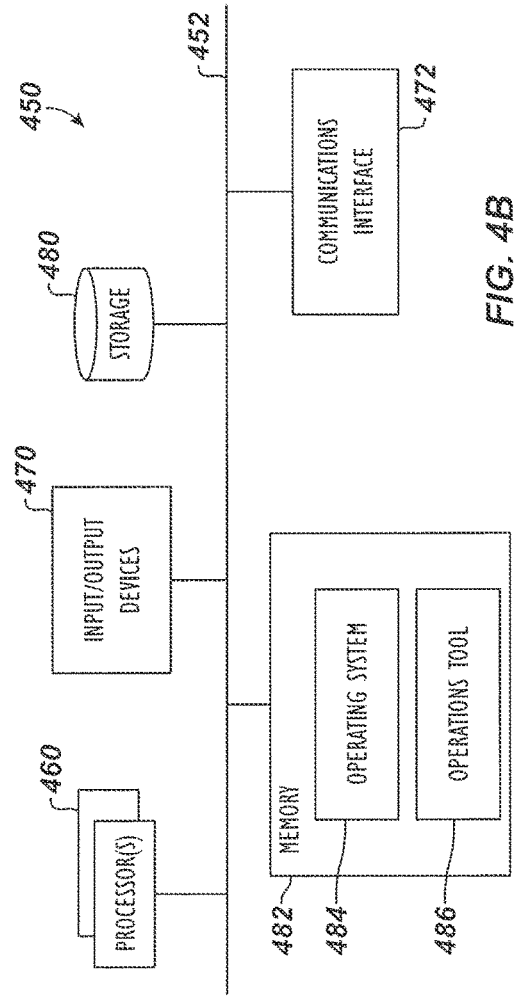

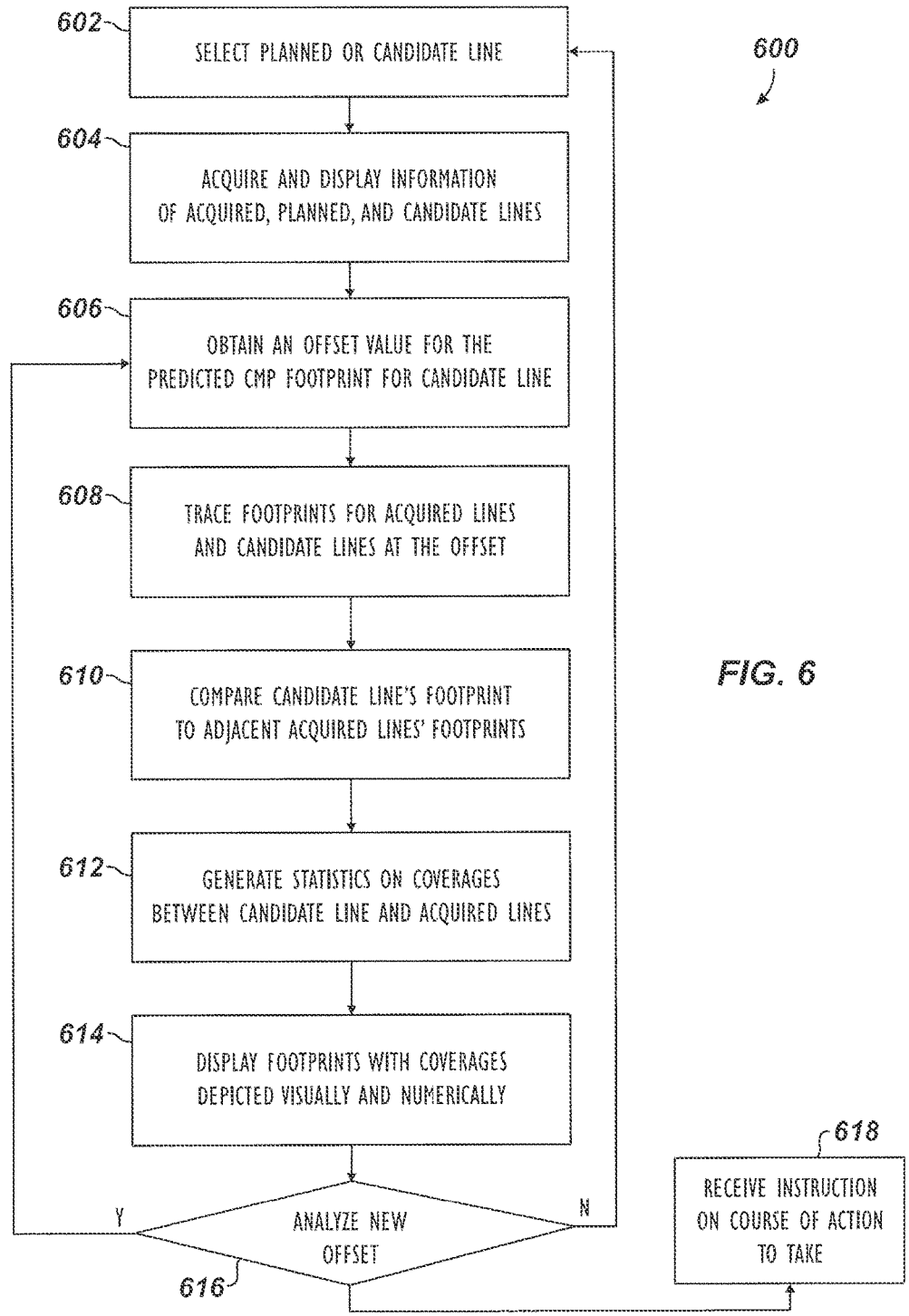

OFFSET FOOTPRINT ANALYSIS FOR SELECTING CANDIDATE LINES FOR SEISMIC SURVEY

CROSS-REFERENCE TO RELATED APPLICATIONS

This application claims priority to U.S. Provisional Appl. No. 62/021,040, filed 4 Jul. 2014, and is with U.S. application Ser. No. 13/479,173, filed 23 May 2012, which are incorporated herein by reference in their entirety.

BACKGROUND OF THE DISCLOSURE

In seismic exploration, scientists and engineers conduct "surveys" utilizing, among other things, seismic and other wave exploration techniques to find oil and gas reservoirs within the Earth. These seismic exploration techniques often include controlling the emission of seismic energy with a seismic source of energy (e.g., dynamite, air guns, vibrators, etc.), and monitoring the Earth's response to the seismic source with one or more receivers (e.g., geophones, hydrophones, accelerometers, etc.). By observing the reflected seismic signals detected by the receiver(s) during the survey, the geophysical data pertaining to reflected signals may be acquired, and these signals may be used to help create an image of the subsurface of the Earth and/or to indicate the composition of the Earth proximate to the survey location.

Geophysical exploration surveys are often conducted over large areas of land or water, often tens, hundreds, or even thousands of square miles. Traditionally, marine surveys are conducted in a "racetrack" manner, where a vessel acquires seismic data in relatively straight sail lines that allow the vessel to cover the most area in the least amount of time.

For example, FIG. 1A shows a plan view of a vessel 101 towing a source 102 and several receivers 103 on streamers 110 behind the vessel 101, and FIG. 1B shows a side-view of the vessel 101 shown in FIG. 1A with the source 102 and receivers 103 being towed behind the vessel 101 beneath the surface of the water.

During operations, the source 102 emits or "fires" seismic energy (e.g., through an air gun), which may reflect off various portions of the Earth 104 and may be received back at the receivers 103 along the streamers 110. The signal received and processed at the receivers 103 may indicate the composition of various portions of the Earth 104 proximate the location where the signal was reflected, for example an oil and/or gas reservoir 105.

FIG. 2 is a plan view of a vessel 201 acquiring seismic data in a "racetrack" manner mentioned above. The seismic data may be acquired along sail lines, each of which may be a planned course for the vessel 201 to travel along. Sail lines may in some cases be referred to as lines, tracks, or sequences; alternatively, in some cases, sequence may refer to the seismic data recorded during acquisition when the vessel 201 travels substantially along a sail line.

Completed lines (e.g., lines along which seismic data has already been acquired) are indicated in bold in FIG. 2, whereas potential candidate lines are represented in FIG. 2 as long dashes. The vessel 201 may have initially acquired data along line 210 while traveling in a southbound direction, then turned left 180 degrees (as shown by the small dashes) and acquired data along line 211 while traveling in a northbound direction. Then, the vessel 201 may have turned left 180 degrees again and acquired seismic data along line 212.

After acquiring data along line 212, the vessel 201 may have many potential candidate lines along which to acquire seismic data, such as lines 220-224. In some instances, the vessel 201 may need to acquire infill data along a particular line 211 to infill incomplete or poor-quality data, for example.

Although the lines in FIG. 2 are relatively straight, it will be appreciated that the actual travel path of the vessel 201 may vary from the intended sail line. During acquisition, many factors impact the quality of the data that is acquired and the time that it takes to acquire that data. For example, in the marine context, sea currents, bad weather, swell noise, seismic interference, other vessels in the area, equipment problems, and so forth may cause imperfections or anomalies in the acquired data. In some instances, data may not be collected at all for certain coordinates (because, for example, sea currents pushed a seismic receiver out of its intended path), or the data may have so much noise or other problems so as to be unusable.

In these cases, the holes in data coverage may need to be rectified by conducting "infill," which may involve a repeat trip by a vessel to the same area. Conventional geophysical seismic surveys often cost thousands or tens of thousands of dollars per hour to complete so repeating the survey to infill data can be costly. Therefore, methods and apparatuses are desired that facilitate determination of locations to acquire data in order to increase the quality of data acquired and reduce costs associated with conducting the surveys.

The subject matter of the present disclosure is directed to overcoming, or at least reducing the effects of, one or more of the problems set forth above.

SUMMARY OF THE DISCLOSURE

A seismic surveying method according to the present disclosure is conducted by at least one vessel with seismic equipment and is operated by an operator. The method involves obtaining developed data related to acquisition of seismic data acquired by sailing along one or more developed sail lines of an acquisition plan. Each of the developed sail lines has a developed footprint of the developed data. (As discussed below, the developed footprint is from the developed data for at least one given offset).

A first candidate footprint is predicted for acquiring first candidate data along a first candidate sail line adjacent one or more of the one or more developed sail lines. The first candidate footprint is compared with respect to the adjacent one or more developed footprints. (This is typically done at the same given offset, as discussed below). The comparison is quantified for the operator, and an instruction is received from the operator for sailing the at least one vessel based on the quantified comparison.

The developed data can be seismic data acquired in a current acquisition of a survey area. In this case, the acquired seismic data for the current acquisition can be data currently acquired by sailing the at least one vessel according to the acquisition plan and gathering the seismic data with the seismic equipment. In this sense, the acquired seismic data can obtained or accessed from current data storage.

Alternatively, the developed data may be pre-existing seismic data from a baseline survey to be used in a 4-D survey. In this case, the method can be used in a pre-survey planning capacity in which historic data of a baseline survey is imported so a 4-D survey can be conducted.

Further, the developed data may simply be a planned, modeled, generated, or predicted form of data produced in a pre-survey planning tool that has yet to acquire data. In this case, the method can be used in a pre-survey planning capacity in which all footprints, comparisons, metrics, etc. are developed based on modelled and/or predicted data. For example, one or more sail lines can be planned for an acquisition plan, and developed footprints for the one or more planned sail lines can be modelled in the developed data. In another example, one or more sail lines can be predicted for the acquisition plan, and developed footprints for the one or more predicted sail lines can be modelled in the developed data.

Accordingly, the developed data discussed herein related to the acquisition of the seismic data acquired by sailing along the one or more developed sail lines of the acquisition plan can include data that is one or more of stored, pre-existing, baseline, modeled, predicted, planned, generated, gathered, acquired, processed, simulated, etc.

To predict the first candidate footprint, at least one common midpoint footprint can be determined for the first candidate sail line, at least one offset can be determined for the predicted common midpoint footprint. In general, the at least one offset can include an in-line offset, a cross-line offset, and/or a radial offset.

To predict the first candidate footprint, the first candidate footprint can be defined by common midpoint lines, at an offset, of outer streamers on a streamer spread of the seismic equipment towed by the at least one vessel under observed and/or predicted conditions. Use of the outer streamers on a streamer spread may be useful when one vessel is involved in the acquisition plan. A multi-vessel survey can use other arrangements. Additionally, acquisition of the first candidate data can be modelled along the first candidate sail line based on at least one factor impacting the acquisition. For example, the at least one factor can include one or more of: environmental information, weather information, sea current information, acquisition geometry, feather, offset, obstruction, operational restriction, observed condition, and predicted condition.

To compare the footprints, information can be spatially displayed. For example, first information representative of the one or more developed footprints can be displayed along with second information representative of the first candidate footprint.

When comparing the footprints, a number of characteristics can be determined. For example, an overlap of at least one attribute can be determined between the developed data and the first candidate data. A gap of at least one attribute can be determined between the developed data and the first candidate data. At least one attribute of the first candidate data can be determined that is unique compared to the developed data.

Overall, the at least one attribute can be an area of a bin grid having an extent of seismic data, a coverage of a bin grid, quality control information, repeatability, a Root Mean Square (RMS) of a seismic signal, a RMS of noise, or any other suitable attribute.

Quantifying the comparison can involve generating one or more metrics on at least one attribute between the first candidate footprint with respect to the adjacent one or more developed footprints. In this way, the first candidate footprint can be traced with respect to the adjacent one or more developed footprints in a visual display, and the display can incorporate the one or more metrics on the at least one attribute. The one or more metrics, for example, can be a statistic on the at least one attribute.

Before receiving the instruction, the method can involve predicting at least one second candidate footprint, comparing that at least one second candidate footprint with respect to the adjacent one or more developed footprints, and quantifying the comparison. In this instance, at least one second offset can be used that is the same as (or different from) a first offset for the first candidate footprint. In this way, candidate footprints can be compared at more than one offset. For instance, a candidate line (A) with a footprint at a first offset (X) can be compared to a candidate line (B) with a footprint at the first offset (X). This form of comparison may be preferred. Still, if desired in a given implementation, one candidate footprint can be compared at two different offsets, such as one candidate line (A) compared at different offsets (X & Y). Further still, if desired in a given implementation, two candidate lines can be compared at different offsets, such as a first candidate line (A) at a first offset (X) compared with a second candidate line (B) at a second offset (Y).

In general, the operator is a user, an automated system, or both. In general, the first candidate sail line can be a planned sail line in the acquisition plan, an infill sail line, a new sail line added to the acquisition plan, or a sail line in the acquisition plan of a 4-D survey of an existing baseline survey. In general, the developed data can include data that is one or more of stored, pre-existing, baseline, modeled, predicted, planned, gathered, acquired, processed, simulated, etc.

To obtain the developed data, the at least one vessel can be sailed according to the acquisition plan and can gather seismic data with the seismic equipment. Alternatively, the developed data can be accessed from storage. In fact, the developed data can be accessed from an existing baseline survey so that a 4-D survey can be conducted.

In another embodiment, a seismic surveying method is conducted by seismic equipment and is operated by an operator. The method involves obtaining seismic data acquired at one or more developed locations of an acquisition plan. Each of the developed locations has a developed footprint from the developed data (for at least one given offset). A first candidate footprint is predicted for acquiring first candidate data at a first candidate location adjacent one or more of the one or more developed locations. The first candidate footprint is compared with respect to the adjacent one or more developed footprints (typically at the same given offset), and the comparison is quantified for the operator. An instruction can then be received from the operator for operating the seismic equipment based on the quantified comparison.

A programmable storage device can have program instructions stored thereon for causing a programmable control device to perform a seismic surveying method of a subsurface volume as disclosed herein.

Additionally, a system can be used for seismic surveying conducted by at least one vessel with seismic equipment and operated by an operator. The system can have an input-output interface, a database, and at least one processing device. The database can at least store first information on an acquisition plan, second information on seismic data acquired along one or more developed sail lines of the acquisition plan, and third information on a developed footprint of the developed data of each of the one or more developed sail lines. The at least one processing device is operatively coupled to the database and the input-output interface. The at least one processing device is configured to perform the seismic surveying processes disclosed herein.

The foregoing summary is not intended to summarize each potential embodiment or every aspect of the present disclosure.

BRIEF DESCRIPTION OF THE DRAWINGS

FIG. 4A is a block diagram of a system for determining a location to acquire seismic data.

FIG. 4B schematically illustrates a computer system or network device for the present disclosure.

FIG. 6 is a flowchart of a process for selecting a candidate line to acquire seismic data during a seismic survey.

DETAILED DESCRIPTION OF THE DISCLOSURE

When conducting a seismic survey with towed equipment along survey lines, operators use a system and method according to the present disclosure for determining a location to acquire seismic data.

A. Process to Determine Candidate Line to Acquire Seismic Data

Figure 1A:
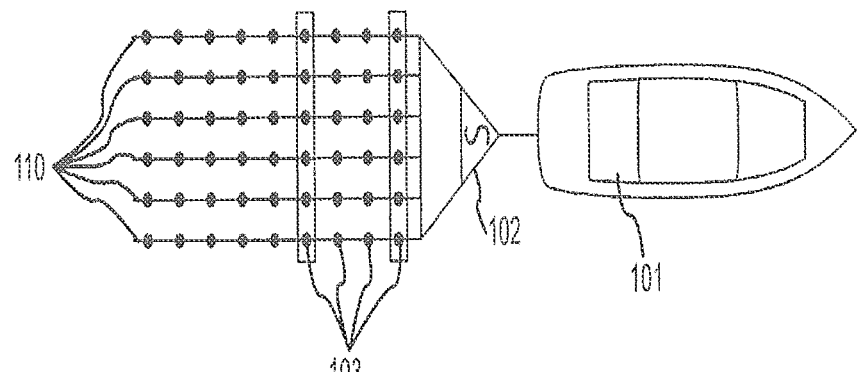
FIG. 1A illustrates a plan view of a vessel towing a seismic source and seismic receivers positioned along streamers behind the vessel.
Figure 2:
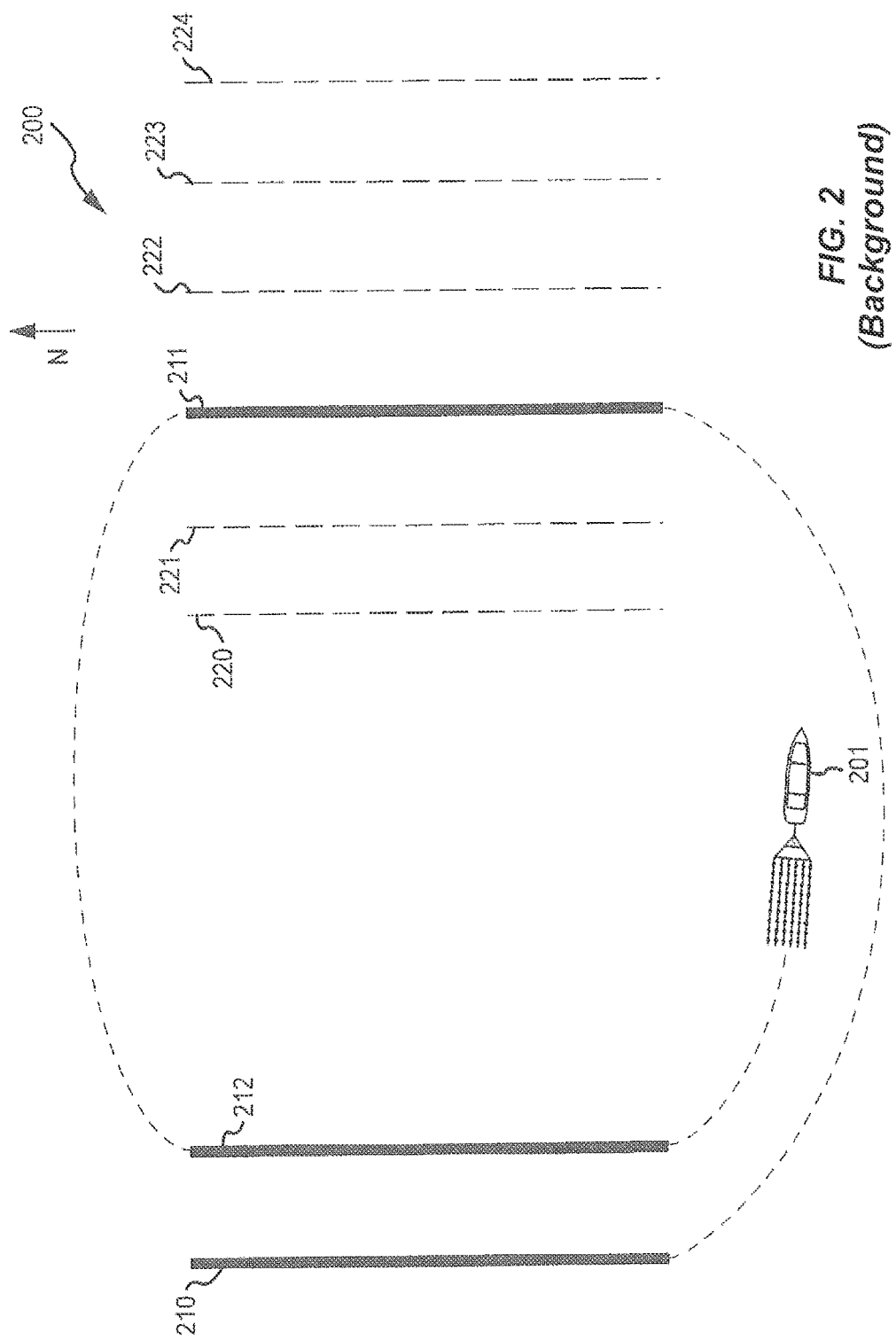
FIG. 2 illustrates a plan view of a vessel acquiring seismic data in a racetrack manner.
Figure 3:
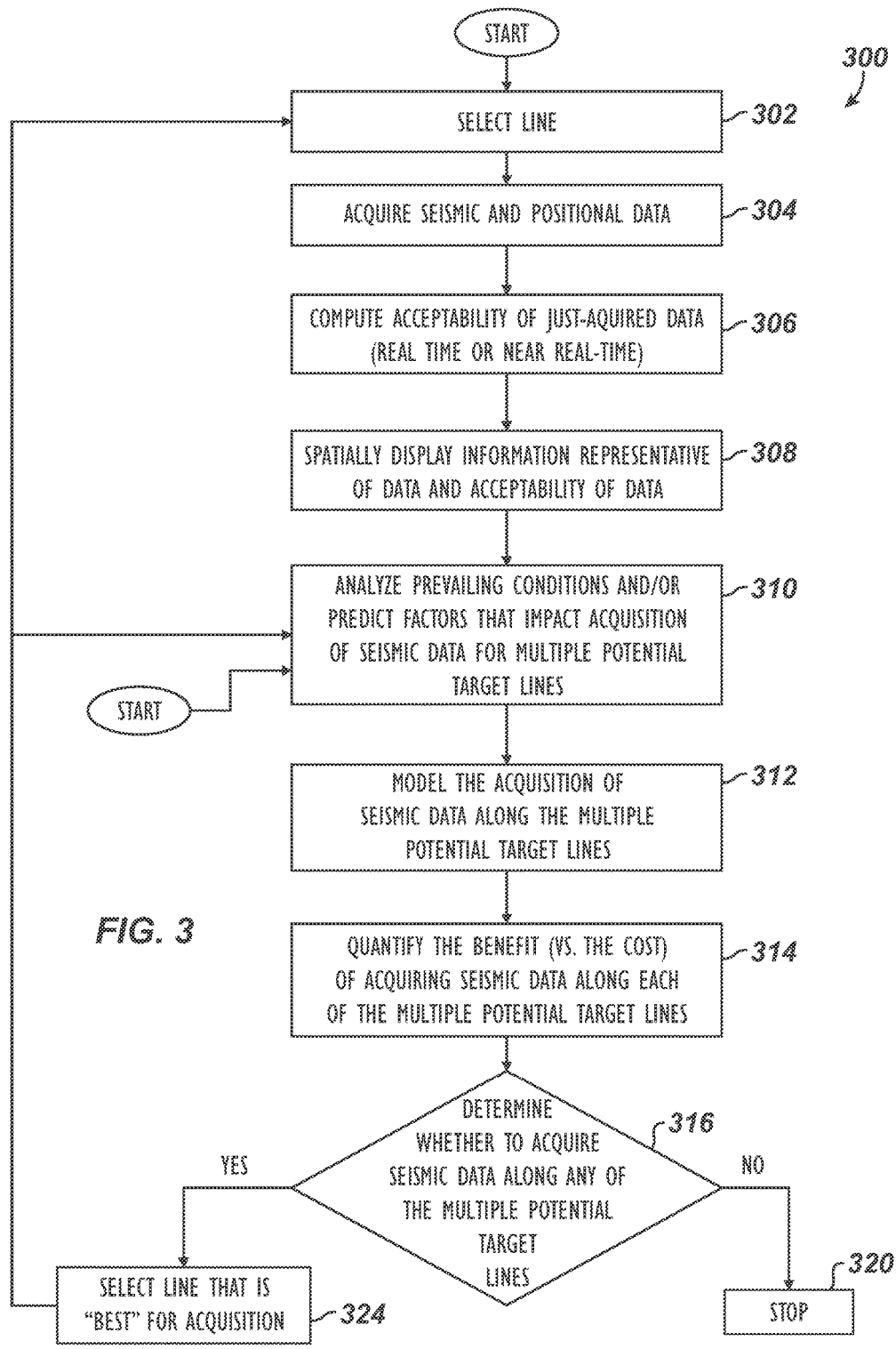
FIG. 3 is a flowchart of a method for determining a location to acquire seismic data.

Turning to FIG. 3, a process 300 is shown in flowchart form for determining a location (e.g., candidate line) to acquire seismic data along survey or sail lines during a seismic survey. To facilitate understanding, discussion of the process 300 in FIG. 3 makes reference to a marine seismic survey, such as shown in FIGS. 1A-2, for example. Thus, the process 300 may, for example, facilitate determining which, if any, of the potential candidate lines 220-224 in FIG. 2 that the vessel 201 should travel along in order to acquire seismic data after completing acquisition (or even during acquisition) along a current survey line 212. As will be discussed below, the process 300 may be carried out by the system illustrated in FIGS. 4A-4B.

The process 300 described below in connection with FIG. 3 may incorporate analysis of prevailing conditions as well as prediction of future conditions in order to determine or plan specific locations for acquiring seismic data. This may allow a user or an automated system to assess the likely acquisition success before any specific line is actually acquired by modeling the potential acquisition of seismic data along a plurality of lines, and may also allow a user or system to predict the likely seismic image quality to be obtained during acquisition as well as to predict an estimated length of time that it will take to acquire seismic data along each of the plurality of lines. This in turn may allow a user or system to improve the efficiency and effectiveness of a seismic data acquisition survey and potentially reduce its cost.

Initially, a candidate line is selected along which to acquire seismic data (Block 302). The candidate line may be selected based on many different factors, such as, for example, a general area in which a survey is needed, customer requirements, based on holes/gaps in previously acquired data, and so forth. In other examples, any type or shape of location in general may be selected, and a line is just one example of a location along which seismic data can be acquired.

Once a candidate line is selected, the seismic survey begins, and seismic data is acquired along that line (Block 304). Both seismic and positional data is measured, and this data is recorded at the vessel or elsewhere. With the survey underway and seismic and positional data being recorded (Block 304), the acceptability of the just-acquired or presently-being-acquired data may be computed (Block 306). This computation(s) may proceed in real-time or in near real-time (i.e., within minutes or even an hour or more after the data is acquired). The computation(s) proceeds as the data is being acquired along a line, or the computation(s) does not begin until acquisition of data along an entire line is complete.

In any event, once the acceptability computations are performed in Block 306 (or as they are being processed), information representative of the acquired data and/or the acceptability of that data may be displayed (Block 308). For example, this display may be spatial, i.e. an aerial-type view of a bin grid. Also, information representative of data acquired along previous lines (or information representative of the acceptability of the data so acquired) may be displayed (spatially, in some cases) alongside information representative of the data just-acquired along the present line. The display of the information may allow a user to understand the value of that data and may help in making decisions about further data acquisition in or around the same area as the previously acquired data (such as in, for example, Blocks 314, 316, and 324, described below).

The display in Block 308 may, however, be skipped in some embodiments (such as in an automated system) and in these cases, flow may proceed directly to analysis operations (Block 310).

In the analysis operations (Block 310), one or more prevailing conditions may be analyzed, and/or one or more factors that may (or will) impact the quality of the yet-to-be-acquired seismic data for one or more potential candidate lines may be predicted. The prevailing conditions may be referred to as "observed factors" and/or as "simple factors," and may include prevailing weather conditions, real-time sea current information, prevailing noise conditions (due to, for example, water swell, weather, other vessels, etc.), equipment conditions, the experience level of the crew on-board the vessel, known acquisition geometry, known streamer feature, known offset (discussed later), operational restrictions, the size, shape, speed (raw speed and turning speed), and type of vessel and/or streamers or other acquisition equipment used, environmental information, and so forth. The factors expected to impact acquisition of the yet-to-be-acquired seismic data may be referred to as "predicted" or "interim" factors, and may include: predicted sea currents, predicted weather, predicted swell noise, predicted seismic interference, predicted noise created by nearby vessels or oil rigs or other bodies, other types of predicted noise, predicted acquisition geometry, predicted streamer feather, predicted offset (discussed later), and so forth.

The likely occurrence, magnitude, frequency, and so on for these various predicted factors may be predicted by many different techniques with many different inputs. For example, historical and/or live weather data and/or historical and/or live sea current data may aid predicting future weather and predicting future sea currents, which may in turn aid in predicting future streamer feather and other acquisition geometry. As another example, previously acquired seismic data (possibly nearby the one or more potential candidate lines) may be used to help make the predictions in the analysis operation (Block 310).

Many other sources of live and/or historical data may be used to help predict the predicted factors that will impact the acquisition of the seismic data. Note that some of the factors impacting acquisition of seismic data may be more amenable to prediction than others. Various factors can impact acquisition of seismic data in several different ways, including impacting the likely image quality (including coverage, noise, repeatability), the time it will likely take to acquire the seismic data in a specific location, the risks and benefits of acquiring seismic data in a specific location, and so forth.

The observed and/or the predicted factors may be analyzed and/or predicted with respect to one or more specific positions or locations, or may be analyzed and/or predicted with respect to one or more specific times. Factors that impact the acquisition of seismic data may be predicted for any number of potential candidate line(s). For example, factors may be predicted for one line, five lines, ten lines, or even one hundred or more potential candidate lines. The lines may be in the same general area, or may be in distant locations one from another. Also, potential future factors may be predicted for a selectable future time window. For example, conditions and factors may be predicted for later in the same day, the next day, a week out, and so forth. In general, the predicted factors may be provided for many different time and spatial windows.

Furthermore, the predictions in the analysis operation (Block 310) may combine both a time window and a defined spatial area or location. For example, the analysis may involve predicting conditions and factors in a first area on a first and a second day, predicting conditions and factors in a second area on a first day and a second day, all in order to determine an acquisition plan or strategy of areas in which to acquire data in during the respective first and second days that will most likely result in the best data being obtained at the lowest cost, or may help prioritize seismic data acquisition for a plurality of lines or locations. Of course, the predictions may involve significantly more areas and significantly more time windows. Also, as an actual acquisition progresses, the predictions may change, and therefore the prediction in operation 310 may be a continuous and/or iterative process, which may result in the operations that follow operation 310 (such as the modeling in operation 312, described in more detail below) also being continuous and/or iterative.

Once one or more factors impacting data acquisition and resulting seismic image quality have been (or are) in the process of being predicted for one or more potential candidate lines per the analysis operation (Block 310), the acquisition of the those potential candidate lines may be modeled (Block 312). Modeling may occur concurrently with the prediction of the one or more factors, it may wait until all of the factors for one potential candidate line are predicted, it may wait until all of the factors for all of the potential candidate lines are predicted, it may wait until one factor is predicted for all of the potential candidate lines, etc.

Modeling the acquisition of one or more potential candidate lines may include predicting or generating seismic attributes and statistics for the candidate lines to be acquired based on the observed factors, the predicted factors, positional information, and so forth. The seismic attributes and/or statistics predicted or generated may be referred to as "modeled attributes," and may include image quality attributes (including coverage, noise, repeatability, etc.), the time it will likely take to acquire the seismic data in a specific location, the risks and benefits of acquiring seismic data in a specific location, and so forth.

Modeling the acquisition may involve assigning weights to various predicted and/or observed factors, and/or may involve calculating a level of confidence in the modeled attributes. As part of assigning weights, for example, the amenability of the factor to prediction may be considered; for example, if a factor is difficult to predict, then a lower weight may be assigned to it, whereas if a factor can be predicted with relative certainty, a higher weight may be assigned to it.

Furthermore, the modeling operation (Block 312) may combine a time window and a defined spatial area or location. For example, the modeling operation may involve modeling acquisition in a first area on a first and a second day, modeling acquisition in a second area on a first day and a second day, all in order to determine an acquisition strategy or plan indicated in which areas to acquire data in during the respective first and second days that will most likely result in the best data being obtained at the lowest cost, or may help prioritize seismic data acquisition for a plurality of lines or locations. Of course, the modeling may involve significantly more areas and significantly more time windows. Also, as an actual acquisition progresses, the predictions may change, and therefore the modeling operation may be a continuous and/or iterative process, which may result in the operations that follow the modeling operation (Block 312) also being continuous and/or iterative.

During or after the modeling of the acquisition of the multiple potential candidate lines (Block 312), the benefit of acquiring seismic data along one or more of the candidate lines may be quantified (Block 314). This quantification may involve weighing the benefit(s) of acquiring seismic data along a particular line against the cost of doing so. It may also involve comparing the benefit of acquiring seismic data along one line versus the benefit of acquiring seismic data along a different line, it may involve quantifying the absolute benefit to acquiring seismic data along one line at all, or it may involve both. Such quantification may allow an operator (i.e., a user and/or an automated system) to determine whether to acquire seismic data along the one line or another, or whether to acquire seismic data along any line(s) at all.

In some cases, such as when acquisition of an infill line is being contemplated, the quantification operation (Block 314) may involve weighing the benefit of acquiring the additional data with the cost of acquiring seismic data along the line again. For example, if acquiring infill data along a line will only improve image quality by 10% but will cost an inordinate amount of time, the infill acquisition may not be worth the additional cost. As another example, if the weather and sea currents are relatively calm, it may be more beneficial to conduct a primary acquisition of a line (e.g., the first pass along a line to acquire original seismic data) than to conduct an infill acquisition along a different line because the infill process may not be as sensitive to quality control issues as the primary acquisition process.

Next, the operator (user and/or automated system) may determine whether to acquire seismic data along any of the multiple candidate lines (Decision 316). The benefits may be compared to one another, but also may be evaluated individually and/or compared against some threshold or maximum value. Thus, a determination is made of which, if any, potential candidate line along which seismic data should be acquired.

In this manner, the process 300 helps determine a location in which to acquire seismic data. Such determinations may be made, for example, within a few minutes up to an hour or two after completing the acquisition of seismic data along one line in order to decide in which direction to steer the vessel. In other cases, such a determination may be made even before acquisition of seismic data along a present line is complete.

Factors that may be considered during such a determination include the quantified benefits determined in the quantification operation (Block 314), the models of the potential acquisition lines from the modeling operation (Block 312), the observed factors, the predicted factors from analysis operation (Block 310), the acceptability of the data calculated in operation (Block 306), the acquired data itself from operation (Block 304), previously acquired data (that may have been displayed, for example, in operation 308), the requirements of the survey or of the customer, and so forth.

If it is determined to not acquire seismic data along any of the multiple candidate lines, the process stops (Block 320). If it is determined that seismic data should be acquired along at least one of the multiple candidate lines, the process can determine which of the multiple candidate lines is the "best" candidate for acquisition of seismic data (Block 324). As with the analysis operation (Block 316), many factors including those listed above may influence the determination of which of the multiple candidate lines is the "best" candidate for acquisition. The vessel may then steer towards the selected line, and the process 300 begins again at Block 304 as indicated in FIG. 3. Additional techniques for evaluating candidate lines are disclosed below, particularly with reference to FIGS. 6 through 10D.

B. System to Determine Survey Line to Acquire Seismic Data

As noted above, FIG. 4A-4B illustrate a system 400 that may be used to determine a location in which to acquire seismic data. For example, the system 400 may be used to carry out the process 300 of FIG. 3 and any other process described herein. As shown in FIG. 4A, the system 400 includes a prediction module 405, an acquisition modeling module 410, a quantification module 415, a comparison module 420, and a determination module 425. As their names imply, these modules may be responsible for performing the various operations outlined in the process 300 of FIG. 3.

During processing, one or more simple factor(s) may be provided to the prediction module 405, to the acquisition modeling module 410, and/or to the quantification module 415. The simple factor(s) may include, for example, prevailing weather conditions, prevailing sea currents, known acquisition geometry, known feather, known offset, operational restrictions (a spatial location in which a platform or other obstruction temporarily or indefinitely excludes acquisition), crew experience level, type (e.g., size, brand, weight, etc.) of equipment (including vessel, streamers, etc.), environmental data, previously acquired seismic data from the same location, and so forth. The simple factor(s) may be observed (e.g., measured) in some embodiments.

The prediction module 405 may receive the simple factor(s) and may generate, in response, one or more predicted factor(s). The predicted factor(s) may include, for example, predicted weather conditions, predicted sea currents, predicted streamer feather, predicted offset, predicted acquisition geometry, and so forth. The prediction module 405 may provide the predicted factor(s) over one or more designated time periods and for one or more designated spatial locations. The prediction module 405 may include some iteration. For example, predicted sea currents may inform predicted streamer feather. Furthermore, the prediction module 405 may run in real-time or near real-time such that the predicted factor(s) provided by the prediction module 405 may be updated as a seismic survey progresses and/or as new simple factor data is provided to the prediction module 405.

The acquisition modeling module 410 may receive the simple and/or the predicted factor(s) along with positional information and may generate, in response, one or more modeled attribute(s). The modeled attributes may be relatively complex, and may include attributes relating to quality of the acquired seismic data, image quality (e.g., bin coverage, repeatability such as $d_{src}+d_{rx}$, noise, etc.), attributes relating to time needed to acquire the seismic data in the first location, risks and costs of acquiring the seismic data in the first location, and so forth. The acquisition modeling module 410 may generate the modeled attribute(s) by modeling acquisition of seismic data in a first location based on one or more of the simple and/or predicted factor(s) that impact acquisition of seismic data in the first location. The acquisition modeling module 410 may provide the modeled attribute(s) over one or more designated time periods and for one or more designated spatial locations. For example, the acquisition modeling module 410 may provide the modeled attribute(s) for each of a plurality of potential acquisition locations such as sail lines. The acquisition modeling module 410 may include some iteration, and may run in real-time or near real-time such that the modeled attribute(s) may be updated as a seismic survey progresses and/or as new simple and/or predicted factor data is provided to the acquisition modeling module 410.

The quantification module 415 may receive one or more modeled attribute(s) from the acquisition modeling module, and may also receive one or more simple factor(s) and/or one or more predicted factor(s). Furthermore, the quantification module 415 may receive survey requirements that are provided, for example, by a customer. The quantification module 415 may provide benefit information (with such benefit information also including risks, costs, and so forth) of acquiring seismic data along each of a plurality of potential lines or other locations to a comparison module 420.

Figure 1B:
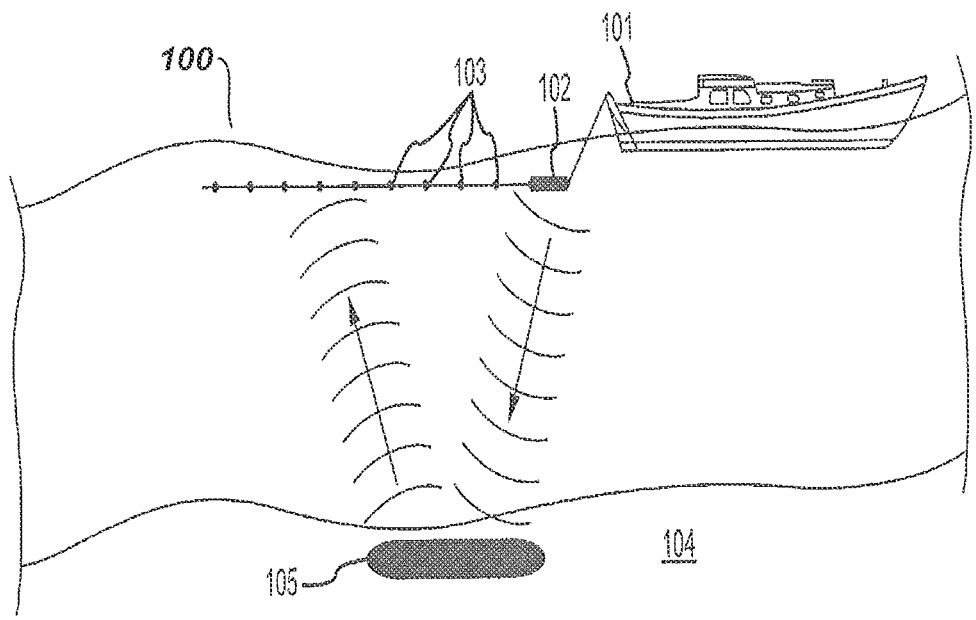
FIG. 1B illustrates a side view of the vessel and streamers of FIG. 1A.

In some embodiments, one of the factors and/or attributes provided to the quantification module 415 may include information about a reservoir (e.g., the reservoir 105 in FIG. 1B). Such reservoir information may include historical data representative of the reservoir (e.g., previous seismic survey information for the reservoir), information representative of the predicted or expected state of the reservoir (e.g., predicted changes in the reservoir since a baseline seismic survey), and so forth. The reservoir information may be used by the quantification module, along with the one or more modeled attribute(s) and/or simple or predicted factors, in order to optimize acquisition of seismic data near the reservoir. For example, if the change in the reservoir is predicted to be small, the monitoring acquisition may need to be relatively controlled and precise in order to detect the subtle changes in the reservoir. On the other hand, if the reservoir is predicted to change substantially, the monitoring acquisition may be relatively coarsely designed. In general, many reservoir-related factors and attributes may be used to help plan an efficient survey near the reservoir.

The comparison module 420 may be coupled to the determination module 425, which may be an automated module and/or may be a module that receives input from a user. The determination module provides a decision of a location in which to acquire seismic data.

C. Example Spatial Plot

Figure 5:
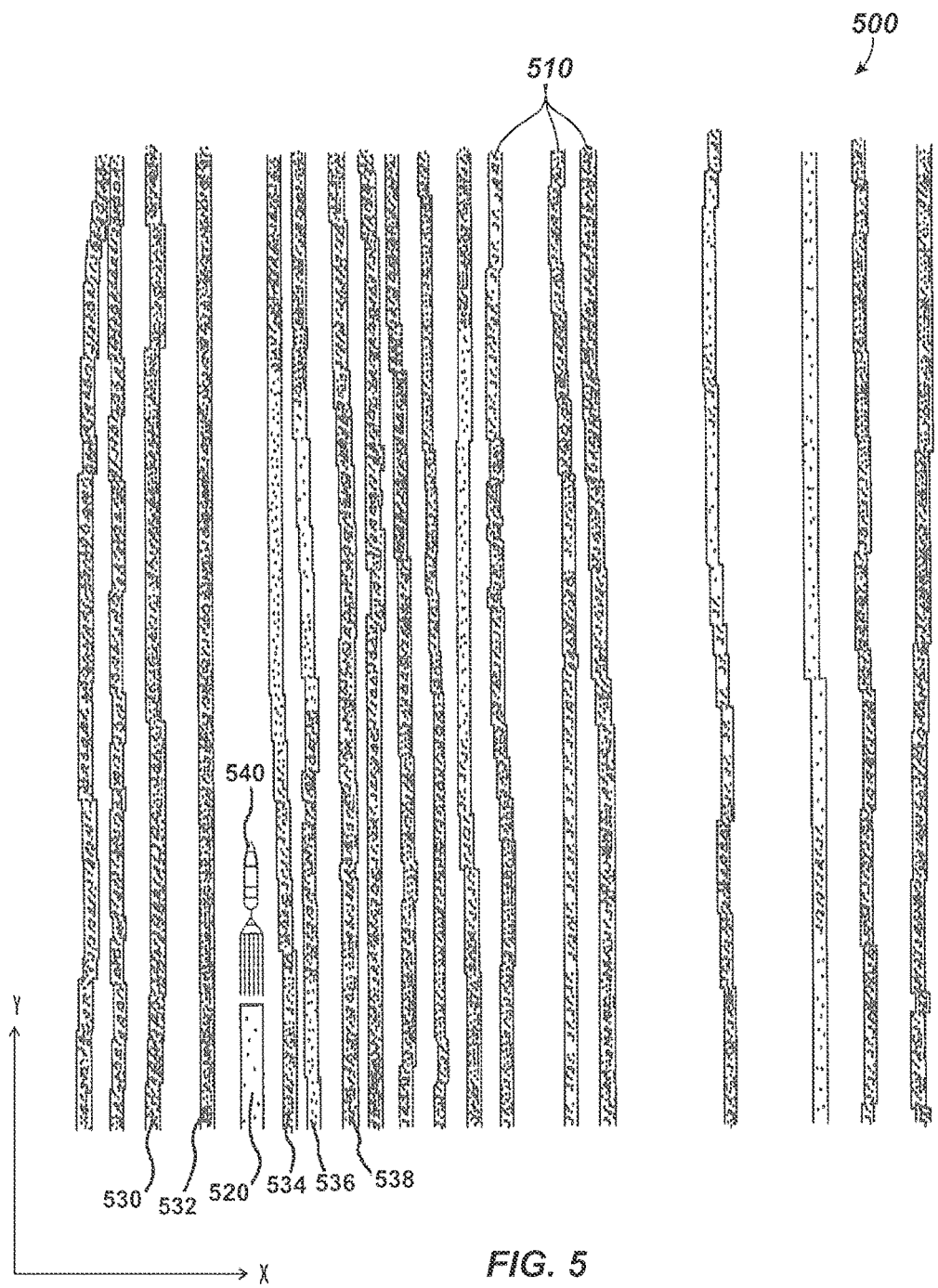
FIG. 5 illustrates a spatial plot of already acquired seismic data as well as the beginning of a line of data that a vessel is in the process of acquiring.

As noted above, one way the disclosed system provides information is through a visual display. As an example of this, FIG. 5 is a spatial plot 500 showing both information representative of previously acquired seismic data from completed lines 510 as well as information representative of seismic data that a vessel 540 is presently in the process of acquiring along a present survey line 520. The data may be spatially displayed in any of a variety of mediums, such as a computer monitor, paper printout, a tablet or notebook computer, a smartphone, and so forth.

The vessel 540 may be acquiring the data in a racetrack manner or in some other suitable manner. The spatial plot 500 also shows information representative of the quality of the data recorded along the completed lines 510. For example, the representative quality of several lines 530, 532, 534, 536, 538 acquired during a seismic survey are shown. Likewise, information is shown representative of the quality of the data on the current line 520 that the vessel 540 is presently in the process of acquiring.

As disclosed herein, the lines for acquiring seismic data are determined according to an acquisition plan (where the acquisition plan may be a proposed course for the vessel 540 to follow). In some cases, the acquisition plan may be based on the spatial display of previously acquired data discussed herein. In other cases, this acquisition plan may be based on the area required to be surveyed by a customer. In still other cases, the acquisition plan may be made as a result of following the process 300 described above with reference to FIG. 3 or the like. In general, the acquisition plan may be any type of predetermined and/or proposed course for the vessel 540 to follow, and the acquisition plan may be predetermined well in advance of the planned acquisition or may be predetermined shortly before the planned acquisition. The acquisition plan may evolve and change during the planned acquisition, as described herein.

Once the candidate line 520 is selected according to the acquisition plan, the survey may begin, and the vessel 540 may begin acquiring seismic data and positional data substantially along the candidate line 520. Once the vessel 540 begins acquiring seismic and positional data, the data may be recorded in storage, and the seismic and positional data may be recorded either separately or together.

As the seismic and positional data is being acquired and recorded (e.g., in real-time) or shortly thereafter (e.g., in near real-time), that data may be combined and/or analyzed, and information representative of such may be spatially displayed. The seismic and positional data may be combined because a spatial display requires both a location and a value of data for that location. In the event that there is previously acquired data, information representative of the previously acquired data may be displayed concurrently with information representative of the data presently being acquired, possibly as an overlay. Alternatively, the data presently being acquired, or the quality of that data, may be tested against some predetermined threshold or acceptable value for analysis by an automated system. For example, if the quality of data presently being acquired is below the predetermined threshold or acceptable value, an alarm may sound to indicate the poor quality of the data.

For example, the shading in FIG. 5 can represent the relative quality of the acquired data, where darker shading indicates better quality and light shading indicates poorer quality. The data that was acquired along some lines 530 and 532 was of relatively good quality. As shown, the vessel 540 may be acquiring data along the current line 520 for the first time in what may be referred to as a primary acquisition, and the data that the vessel 540 is acquiring may be poor quality, perhaps because of stormy weather conditions or strong sea currents.

If the operator (e.g., user, automated system, or both) analyzes the spatial plot 500 as the vessel 540 is acquiring the line 520, a decision may be made to acquire data in a different location due to the bad weather conditions and poor quality of the data being acquired. This decision may be based, at least in part, on a desire to acquire relatively good quality data during the primary acquisition along the line 520.

If a determination is made to terminate acquisition of data along the line 520, the vessel 540 may continue acquiring data in a different location. For example, the vessel 540 may acquire infill data (which may not be as sensitive of an acquisition process to quality control issues as a primary acquisition process), along the remaining portion of the adjacent line 534 in order to fill in gaps or imperfections in the data already acquired along that line. As will be appreciated, the previously acquired lines and the presently being acquired line in FIG. 5 are merely given as an example, and many other paths for the vessel 540 are possible.

Although a single layer of information representative of seismic data, such as quality control information, is shown here in FIG. 5, the spatial plot 500 may include multiple layers of information. For example, a top layer may be representative of a combination of several types of quality control information, a second layer may be representative of bin coverage, a third layer may be representative of the Root Mean Square (RMS) of a seismic signal, a fourth layer may be representative of the RMS of noise, and so forth. A user viewing the spatial plot 500 may choose to display or hide one or more layers.

In some cases, each point of data in the spatial display 500 may be representative of a source fired at that location, with the data from the different receivers on different streamers being summed and averaged. So for example, a data point at location x, y may be representative of a source that was fired at the coordinate associated with x, y and may be calculated by combining quality control data from all of the reflections of that source shot "heard" by all of the receivers. There are also many other ways of calculating data values at each point. Each point of data in the spatial display 500 may be representative of a seismic signal received at that location, or may be representative of a common midpoint (CMP) at that location, and so forth. Common midpoint (CMP) can also be referred to as common depth point (CDP).

If a user selects a particular point of data in the spatial display 500, the user may be able to see all of the data associated with that particular location. For example, if a user selects the point associated with location x, y, the user may be shown the RMS of the signal at that location, the RMS of the signal noise at that location, the source or gun volume at that location, the individual signals received by each receiver associated with the shot emitted at that location, and any other seismic data, positional data, or quality control data, and so forth.

Further details related to the process 300 of FIG. 3, the system 400 of FIG. 4A, the spatial display 500 of FIG. 5, and other feature can be found in the copending with U.S. application Ser. No. 13/479,173, published as U.S. Pub. 2012/0300583, which has been incorporated herein by reference.

D. Process to Select Candidate Line Based on Feather

To determine the "best" candidate line for acquisition, a system according to the present disclosure (such as system 400, 450) can compare feather values of the seismic spread's footprint when analyzing acquisition candidates under the observed/predicted conditions. Feather is the angle between any two points on the streamer and a reference direction (e.g., the vessel's shooting direction or sail line). The value can quantify the amount of angle that the spread is predicted to have relative to the vessel under the observed/predicted conditions as the vessel traverses a survey line.

In this form of analysis, the predicted feather angle of the streamers relative to the survey direction can be used as a criterion in assessing which candidate line to select. The predicted feather angle is compared against a desired angle to determine which candidate line would be best for acquiring data. For instance, the user can be provided with particular graphs and statistics on feather values that match for each possible candidate line, and the user can select one of the candidate lines to use based on the provided graphs and statistics. However, feather angle may only offer an approximation of the streamer shape and may not take into account the position of the streamers or the vessel. Instead, the feather angle may assume the location of the streamers and the vessel, which is not always accurate.

E. Process to Select Candidate Line Based on Footprint and Offset

In the end, the analysis based solely on the comparison of feather values, while useful, may not always indicate how the resultant bin attribute (e.g., coverage) from the candidate line will be affected by observed/predicted conditions. Accordingly, rather than using feather values alone, a system according to the present disclosure (such as system 400, 450) selects (or helps a user select) the candidate line to traverse during the survey by estimating a footprint of the candidate line for the survey. The footprint is calculated from predicted and actual in-water equipment locations and observed/predicted conditions (especially ocean currents). When presented to the user, the footprints are easier to visualize and understand than feather angles of the streamer spread.

These footprints can be calculated based on a predicted common midpoint (CMP) of a seismic spread of streamers traversing locations (sail line) during a survey. The system then uses an offset footprint analysis to analyze candidate lines based on the predicted CMP footprints, at any offset, of the seismic spread under the influence of ocean currents and other possible conditions. Details of the offset footprint analysis are discussed below with reference to FIGS. 6 through 10D.

As noted above, the footprints can be calculated based on the predicted CMP positions on the seismic spread. Thus, the footprints are bin aligned, meaning the CMP positions are binned and traces are made around the bins having data to delineate the footprints. Thus, a footprint covers an area of the bin grid that has the extents of seismic data and/or some attribute thereof. The footprints may be generated from coverage data, or more generally the footprints may be generated from any binned attribute, one of which is coverage. For purposes of discussion herein, reference may be made to coverage as one attribute used to generate the footprint, but it will be appreciated that this may refer to any binned attribute. For example, the attribute may be representative of a combination of several types of quality control information, bin coverage, repeatability, the Root Mean Square (RMS) of a seismic signal, the RMS of noise, and so forth.

Turning to FIG. 6, a process 600 is shown for determining a candidate line to acquire seismic data during a seismic survey. The process 600 can be implemented using a system, such as system 400, 450 disclosed in FIGS. 4A-4B. During operations as seismic data is acquired along a survey line traversed by a vessel, one or more planned or candidate lines are selected for analysis (Block 602). For example, the operator (i.e., the user and/or the automated system) may select one or more particular candidate lines to traverse during the survey as the vessel is acquiring data along a current survey line. In the current example, the candidate line can in general be a planned sail line already in the acquisition plan, a new infill sail line added to the acquisition plan, an ad hoc sail line, or some other acquisition line or location.

Although reference is made herein to one vessel in the seismic survey, it will be appreciated that the teachings of the present disclosure can be used in multi-vessel seismic operations. Moreover, as discussed above, the teachings of the present disclosure can be used for "developed data" and not just "acquired" data. In general, the "developed data" involved in the process 600 is related to acquisition of seismic data acquired by sailing along one or more developed sail lines of an acquisition plane. "Developed" can refer to data and sail lines that are stored, pre-existing, baseline, modeled, predicted, planned, generated, gathered, acquired, processed, simulated, etc. For the sake of discussion, however, the data and sail lines of the acquisition plan are referred to herein as being "acquired." Yet, with the benefit of the present disclosure, it will be appreciated that the data and sail lines of the acquisition plan can be other than "acquired" and can be stored, pre-existing, baseline, modeled, predicted, planned, generated, gathered, processed, simulated, etc.

As with previous processes disclosed herein, the process 600 may incorporate analysis of prevailing conditions as well as prediction of future conditions to determine or plan specific survey lines for acquiring seismic data. This may allow the operator (a user and/or an automated system) to assess the likely acquisition success before any specific line is actually acquired by modeling the potential acquisition of seismic data along a plurality of lines, and may also allow a user or system to predict the likely seismic image quality to be obtained during acquisition as well as to predict an estimated length of time that it will take to acquire seismic data along each of the plurality of lines. This, in turn, may allow the operator to improve the efficiency and effectiveness of a seismic data acquisition survey and potentially reduce its cost.

As the survey is then conducted, the system keeps track of and displays information about the acquired lines, planned lines, and candidate lines based on observed/predicted conditions (Block 604). As noted previously, these operations can take place as the vessel tows the spread and acquires data. When it is desired to determine which of the available candidate lines to select, the operator (user and/or automated system) can select, be assigned, calculate, and the like an offset value to use for analyzing the one or more candidate lines under the observed/predicted conditions (Block 606).

The offset value, rather than being quantified as a feather value predicted for the spread under observed/predicted conditions, is instead a predicted footprint defined by the CMP lines, at given offsets (i.e., inline offset, cross-line offset, and/or radial offset), of the outer streamers on the streamer spread as the vessel tows the spread under the observed/predicted conditions. Thus, the offset value like feather angle and the like is governed by observed/predicted conditions. Accordingly, the offset value can be predicted, modeled, calculated, and the like based on the observed/ predicted conditions, such as information about weather, ocean currents, vessel speed, spread shape, type of seismic equipment, and other factors discussed herein. In the current example, the CMP lines of the outer streamers are used for the predicted footprint. This is suited for a single vessel survey. For a multi-vessel survey, the offset may be defined by the outermost CMP lines of the survey.

A preferred approach is to bin only the outermost CMP lines for the predicted footprint. However, alternative approaches may be used. For example, a traced outline of a binned attribute at an offset may be used for the predicted footprint rather than binning the CMP lines. This alternative traced outline approach may be used for 4-D surveys and multi-vessel surveys.

To help depict the features of the footprints, CMP lines, and offset, FIGS. 7A-7D show simplified details related to common midpoint (CMP), offsets, shot intervals, CMP lines, and the like for representative streamers, vessel, source, receivers, etc.

As is known, source shots (S) are made at shot intervals of planned distances during a survey as a vessel traverses a survey line, and receivers (e.g., R1-Rn) on the streamer(s) have defined spacing between them and receive reflected seismic signals from reflectors in the subsurface. The inline offset (FIG. 7D) refers to the distance between source shots (S) and receiver (e.g., R1-Rn). The cross-line offset (FIG. 7D) refers to the perpendicular distance across the CMP lines. These and other features of offsets, common midpoint locations or lines, and the like depend on the particular configuration of the streamer spread (e.g., number of streamers, cross-line spacing, number of sources, number of receivers, distances between components, etc.) and other conditions.

Figure 7A:
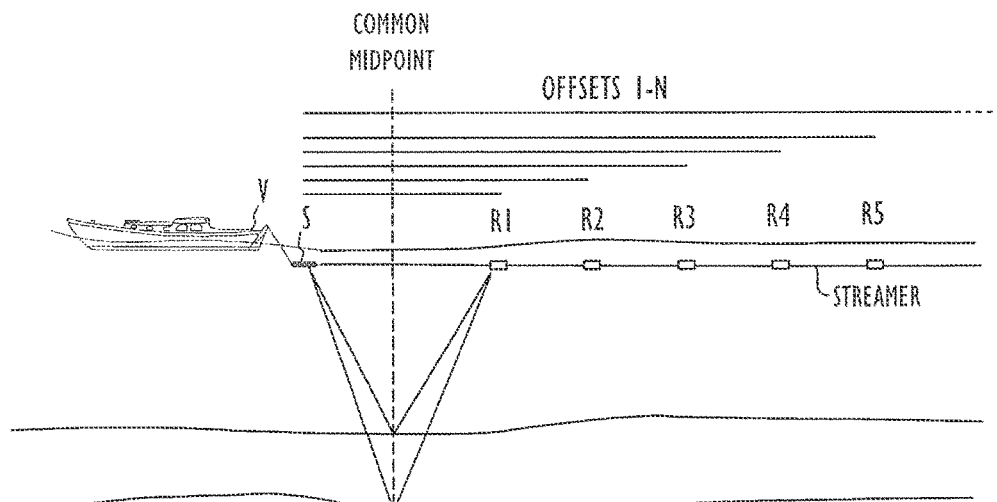
FIGS. 7A-7D show representative details of common midpoint (CMP), offset, shot intervals, and the like used during discussions herein.
Figure 7B:
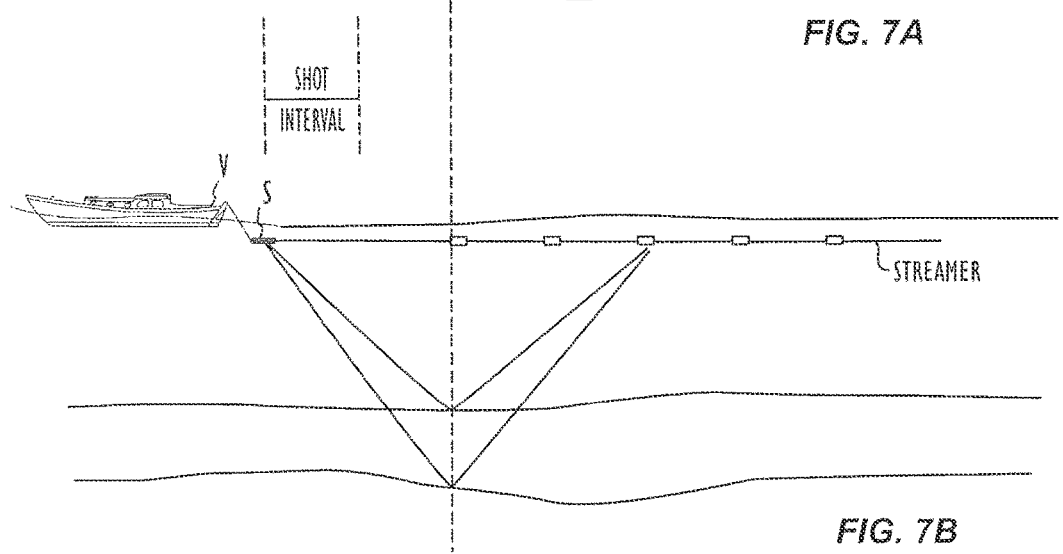
Figure 7C:
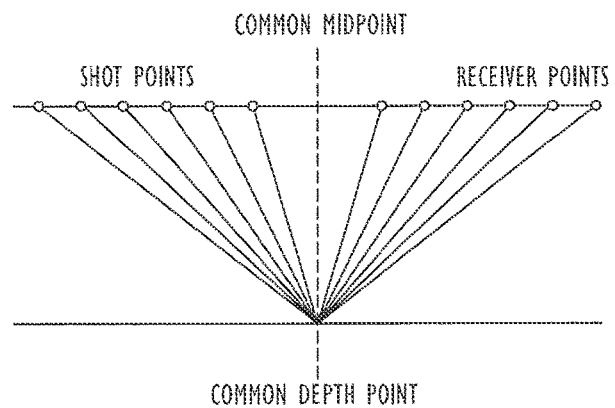
Figure 7D:
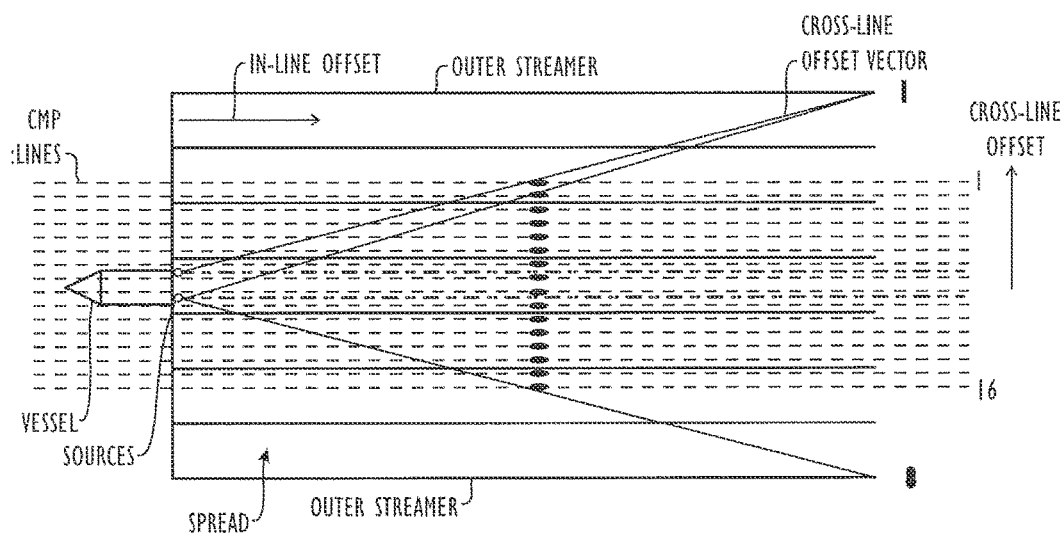

As but one particular example, FIG. 7D shows a plan view of a vessel towing a spread of eight streamers and two sources. The CMP lines are depicted, and the CMP locations for the last receivers on the eight streamers are shown. Because the depicted configuration has eight streamers and tow sources, there are sixteen CMP lines. Other arrangements would produce other configurations. The direction of the inline offset is depicted, as is the direction of the cross-line offset. Cross-line offset vectors are also shown from the sources to the last receivers on the outer streamers. The cross-line offset vector is effetely a radial offset.

The common midpoint (CMP) lines and other variables noted herein are used during seismic analysis to gather subset of traces from the seismic dataset, such as when performing a common midpoint gather of the seismic data set, which can minimize effects of dip in subsurface structures and increase the signal-to-noise ratio.

Figure 7E:
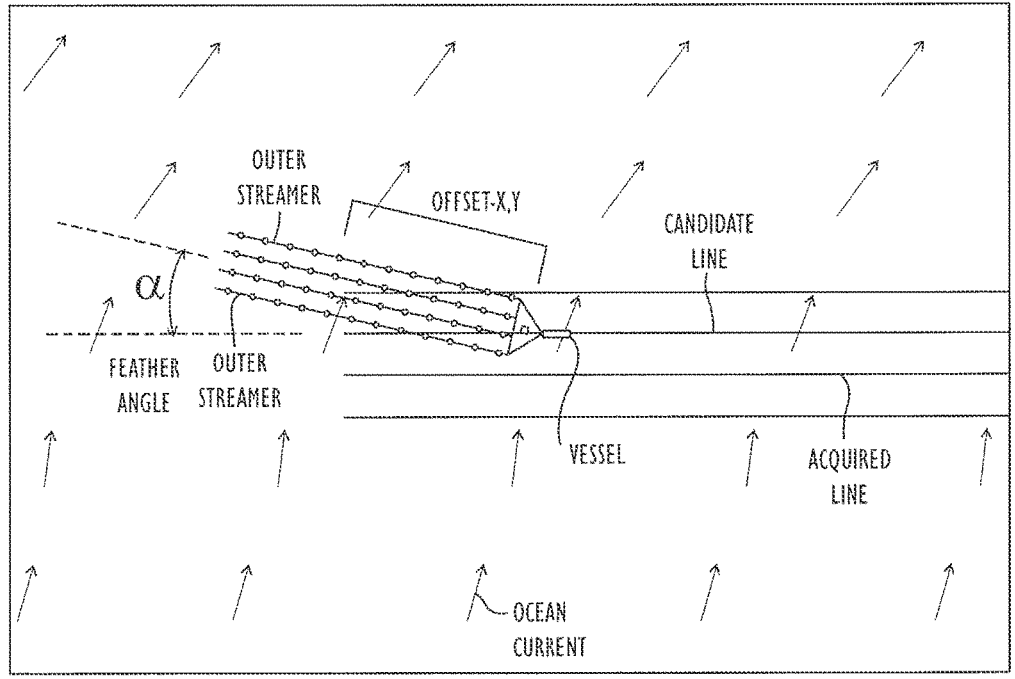
FIG. 7E shows a representation of a vessel towing a streamer spread affected by ocean current as the vessel traverses a candidate line.

For illustrative purposes, FIG. 7E shows a displayed view of a vessel traversing a candidate line, as currents and other environmental conditions produce a feather of the streamer spread. The streamers have a feather angle $\alpha$ relative to the candidate line of the vessel, which can affect the quality and repeatability of the seismic data to be obtained along this line. Although shown simplified here, the shape of the streamers may not be as uniform. However, cross-bracing, active streamer positioning, and other techniques known in the art can be used to account for variances.

Rather than looking at feather angle $\alpha$ when analyzing the candidate line, the disclosed system traces a footprint of the CMP lines for the spread's outer streamers at a specified offset. (Details of the footprint traces are discussed later, for example, with reference to FIGS. 8A-8B.) The information is then used to analyze the coverage or other binned attribute provided by the candidate line under the observed/predicted environmental conditions.

Returning to the process 600 of FIG. 6, the spread's footprints defined by the CMP lines for the outer streamers at the specified offset (Block 606) are then traced as footprints for both existing acquired lines and planned or candidate lines (Block 608). The acquired footprints for the existing acquired lines can be traced based on a known offset value determined by the existing conditions at the time of their acquisition, although the offset can be modeled based on conditions. By contrast, the footprint for the candidate line can be traced based on a predicted offset value determined by observed/predicted conditions at the time of its acquisition (likely in the near future).

The candidate line's footprint is then compared to the adjacent lines' footprints (Block 610), and the comparison of the candidate line's footprint to the adjacent one more acquired lines' footprints is then quantified (Block 612). For instance, metrics (e.g., statistics) can be generated for one or more of total, unique, overlap, and gap bins of the binned attribute (e.g., coverage). Again, although reference is made here to coverage, any binned attribute may be used. The gap area of the binned attribute may be referenced in terms of bins lacking the binned attribute.

To help users assess the candidate line, the footprints can also be visualized on a spatial display or map to explain the metrics (Block 614). In general, the metrics quantify the binned attribute provided by a candidate line for a survey or otherwise communicate the efficacy of selecting a particular line for the survey. Although the metrics discussed herein include data derived from the footprints, other metrics can be used that extend beyond just the data derived from the footprints. For example, the metric can be based on a "unique bins per hour" measure that takes both the footprint and the time to travel to and then acquire a candidate line. This and other types of metrics may be helpful in assessing candidate lines.

In the course of the analysis, the operator (user and/or automated system) can select to analyze the information at another offset value (Decision 616), and another offset value can be selected to further assess the candidate line and the binned attribute (e.g., coverage) it might be predicted to provide for the seismic survey. Additionally in the course of the analysis, the operator can select to analyze another candidate line by returning to Block 602 so that another candidate line and offsets can be selected to further assess how best to achieve the desired binned attribute (e.g., coverage) for the seismic survey.

In the end, an instruction can be received from the operator (i.e., user and/or automated system) for sailing the vessel based on the quantified comparison(s) (Block 618). For example, the operator can select a particular course of action and a candidate line to sail for the acquisition plan after deciding the results will be beneficial to the acquisition of the desired seismic data. The vessel can then be operated according to the selected course of action and sail line. Alternatively, a course of action or candidate line can be aborted or altered in process. In general, the instruction can involve any of the various decisions disclosed herein that assess costs or benefits of acquiring seismic data based on predicted, modelled, or known attributes, image quality, amount of time, environmental conditions, noise, and the like discussed herein.

F. Representation of Determining Candidate Line Based on Footprint and Offset

Figure 8A:
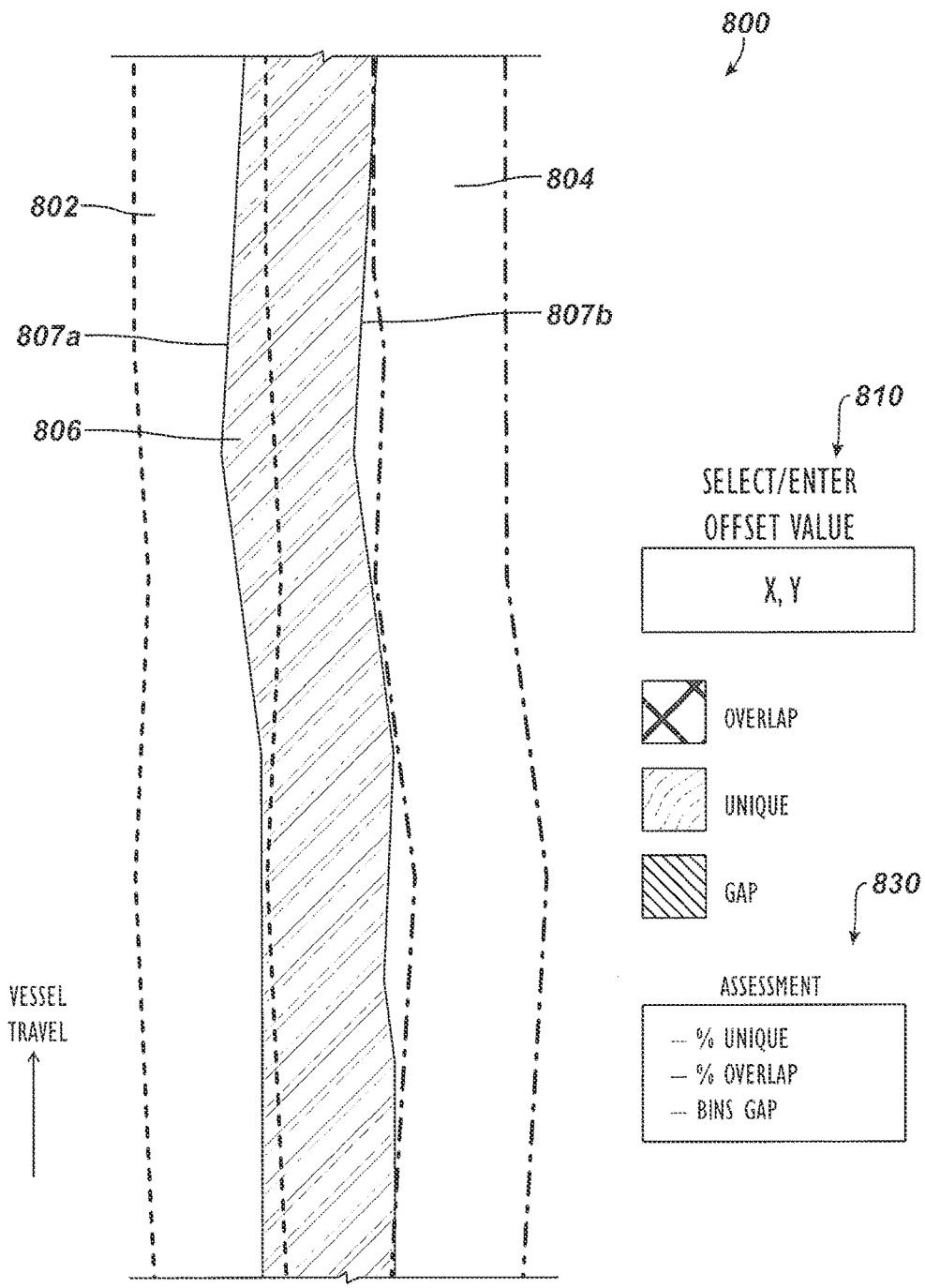
FIGS. 8A-8B illustrate representations of footprints for survey lines during analysis by the process of FIG. 6.
Figure 8B:
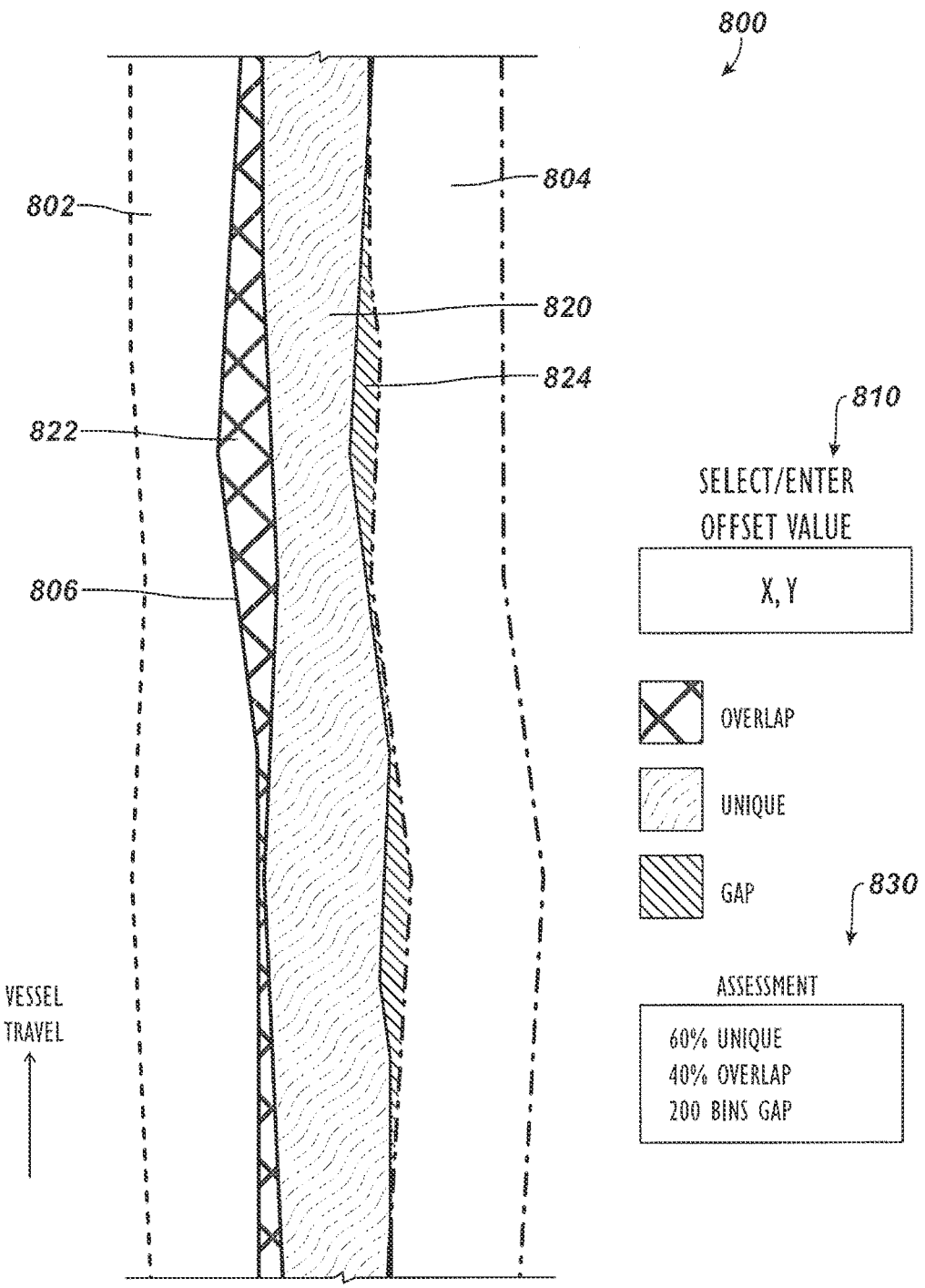

FIGS. 8A-8B depict a visual representation of footprints 800 for survey lines during the processing of FIG. 6. Only a portion of the footprints 800 are illustrated, and it will be understood that the footprints 800 may extend a considerable distance along the survey lines and may or may not be relatively straight. These footprints 800 can be viewed, manipulated, and the like using the system as disclosed herein. To help users, the footprints 800 can also be visualized on a spatial display or map of the seismic survey area and can include information about existing or predicted conditions (e.g., ocean currents) that may affect the survey.

As noted above, the CMP lines for the outer streamers of the spread (not shown) at a specified offset are traced as the footprints 800 for both existing acquired lines 802 and 804 and planned or candidate lines 806. Here, existing acquired footprints 802 and 804 are shown relative to a candidate line's footprint 806, which has the CMP lines 807a-b traced for the outer streamers. These footprints 800 are generated and shown at an offset values, which may be the same or different for each and may be manually entered or automatically configured through processing.

As noted above, the candidate line's footprint 806 is compared to the adjacent lines' footprints 802 and 804, and metrics (e.g., statistics) are generated for total, unique, overlap, and gap bins of the binned attribute (e.g., coverage) to help determine which candidate line to use. Again, the footprints 800 can be visualized on the map with numerical metrics calculated by the analysis. Although the candidate footprint 806 is shown adjacent footprint 802, 804 on both sides, current acquisition may have only obtained one acquired footprint 802 or 804 so far during the survey.

In particular, FIG. 8B shows the representation of the footprints 800 having calculated metrics 830 for the binned attribute (e.g., coverage) at the given offset value 810. In the analysis, unique bins 820 of the binned attribute for the candidate footprint 806 at the given offset value 810 is calculated and displayed. The unique bins 820 can be physically depicted relative to the other footprints 802 and 804 and can be quantified with an assessed value in a table 830 or the like. The assessed value can be provided as any suitable metric, such as a percentage of the overall coverage provided by the candidate footprint 806. Overlap bins 822 of the binned attribute and gap bins 824 in the binned attribute can be similarly calculated, quantified, and displayed. As shown here in the metrics 830, the gap bins 824 in the binned attribute may be quantified in terms of the number of bins predicted to lack proper data acquisition.

By analyzing the footprints for candidate lines at different offset values and based on entered conditions, the system and user can assess the best candidate line to use in conducting the survey during the decision processes disclosed herein.

G. Process to Select Candidate Line in 4D Survey

The analysis in FIG. 6 of candidate lines can be extended for use in a 4D survey. Details related to this process 600 are provided in FIG. 9, which has many comparable steps to those depicted in FIG. 6 so that they are not repeated here.

In a 4D towed streamer survey, a towed streamer spread is towed relative to a previously surveyed area for which a previous 3D towed streamer survey (i.e., a baseline survey) has been conducted. In conducting the new survey, it is desirable to repeat the survey lines of the previous survey for consistency. In essence, the 3D towed streamer surveys serves as the baseline for the subsequent 4D survey at a later time. For this reason, being able to acquire highly repeatable 3D streamer data adds significant value to any future 4D survey to be conducted.

Once the 4D survey has been conducted and analyzed, information from the 4D survey can be used to monitor the reservoir and its change over time during production and other operations. This reservoir monitoring can help with better use of assets.

To improve 3D (and by definition 4D) towed streamer capabilities, positioning errors of the streamers are preferably reduced by using better position estimates, maintaining streamers closer together for increased image resolution, reducing noise, integrated navigation and data management systems for real-time course correction and processing-ready data, and the like. The various parts of the acquisition system operate as an integrated unit in order to optimize 4D imaging capabilities in the towed streamer environment. The integrated unit uses magnetic compass headings, GPS receivers on buoys, lateral positioning devices for streamer, acoustic cross-bracing equipment and analysis, etc.

As expected, however, rough weather degrades compass measurements and subjects the entire streamer spread to erratic shapes. Continuous survey course corrections with certain towing speeds can create further uncertainty in locating the receivers on the streamers. These and other problems can produce positioning errors. In the 4D survey, the impact is more serious when trying to match subsequent time-lapsed surveys to the original baseline data.

High-resolution seismic acquisition requires a vessel to tow multiple streamers, such as 6, 8, 12 or more streamers. In a perfect world, all of the towed streamers would move through the water parallel to each other and in-line with the vessel. However, conditions, such as current changes, winds, and vessel heading changes, cause the streamers to feather and form asymmetrical shapes. Due to these outside influences, streamer control and positioning face many constraints, including asymmetrical streamer shapes, cross-line bin asymmetry, receiver locations that cannot be repeated in a subsequent survey, streamer feathering control, difficulty acquiring data around obstructions, and the like. Separately or in combination, these constraints hamper the accurate 4D imaging of the subsurface. Using known techniques such as acoustic cross-bracing and lateral streamer control, operators can position streamer sections, an entire streamer, or the entire spread to better match the receiver locations of the baseline survey.

Figure 9:
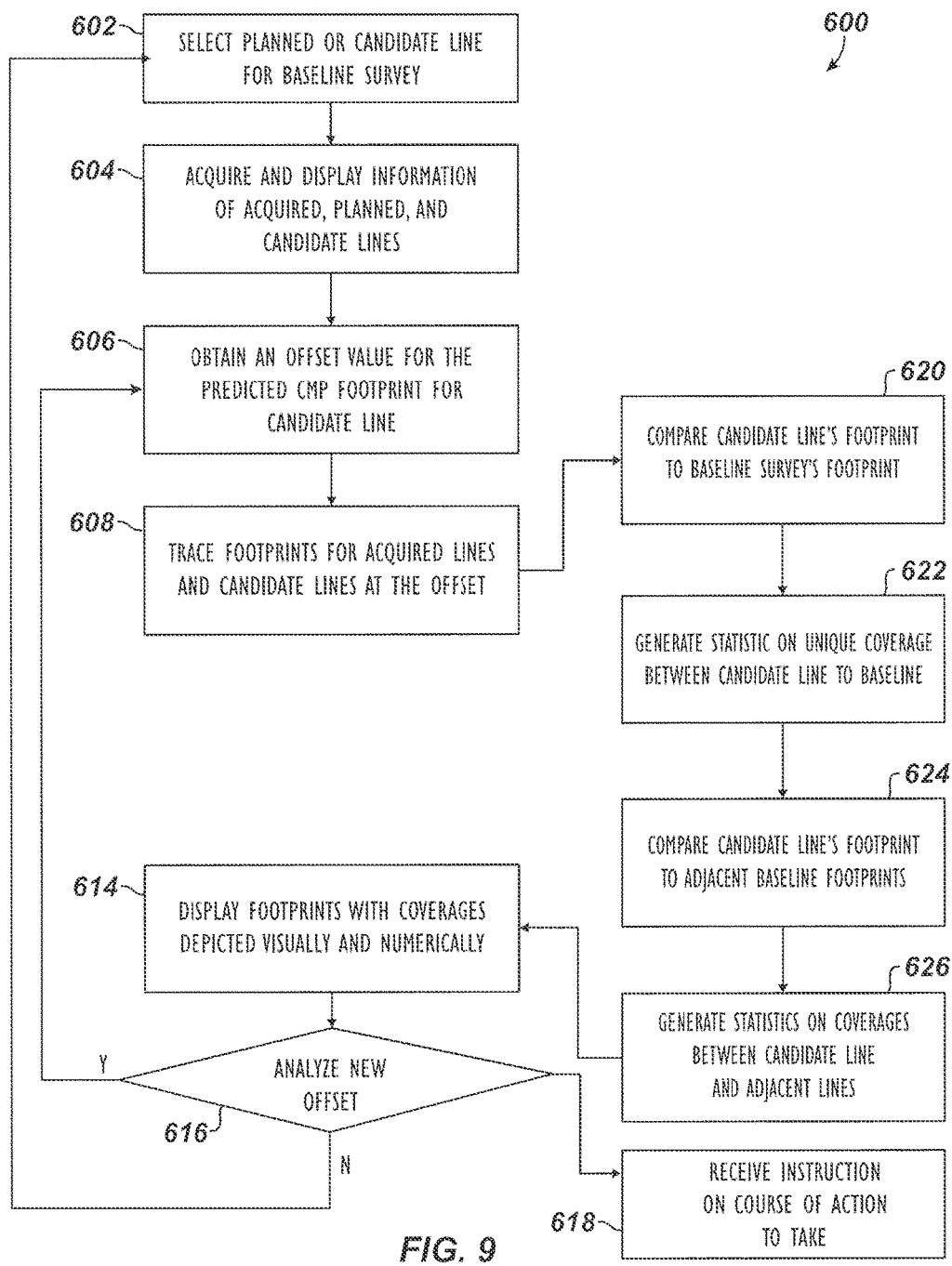
FIG. 9 is a flowchart of a process for selecting a candidate line to acquire seismic data during a 4-D survey.

The analysis provided in FIG. 9 is intended to further improve the operator's ability to conduct a 4D survey over an existing baseline survey. After selecting a candidate line in the 4D survey and an offset during analysis, the footprints for the baseline survey lines and the candidate line are traced in the manner noted previously (Block 608). At this point, a first pass of the analysis compares the predicted footprint of the candidate line to the baseline survey (Block 620), and metrics are generated (Block 622). For this first pass, the unique footprint area from the corresponding baseline line (compared to the footprints of adjacent baseline or available new pass lines) is used for comparison to the predicted footprint. This gives the unique coverage (or repeatability attribute) obtained by the candidate line in the 4D survey relative to the baseline survey, and the user or the automated system can uses this when assessing the candidate line relative to other possible lines.

In a subsequent pass of the information, the binned attribute (e.g., coverage) of the predicted footprint for the candidate line is compared with the adjacent survey lines (baseline, or where available new pass lines) (Block 624), and metrics are generated (Block 626). In this comparison, the system evaluates the gap filled and the gap unfiled by the candidate line's predicted footprint.

Additional analysis can be performed (Decision 616) as discussed before. In the end, the resulting information can indicate to a user or the system whether a candidate line would provide a footprint under observed/predicted conditions that provides the best binned attribute (e.g., coverage) relative to the original baseline's footprint. Ultimately, an instruction can be received from the operator (i.e., user and/or automated system) for sailing the vessel based on the quantified comparison(s) (Block 618).

H. Representation of Determining Candidate Line in 4D Survey

Figure 10A:
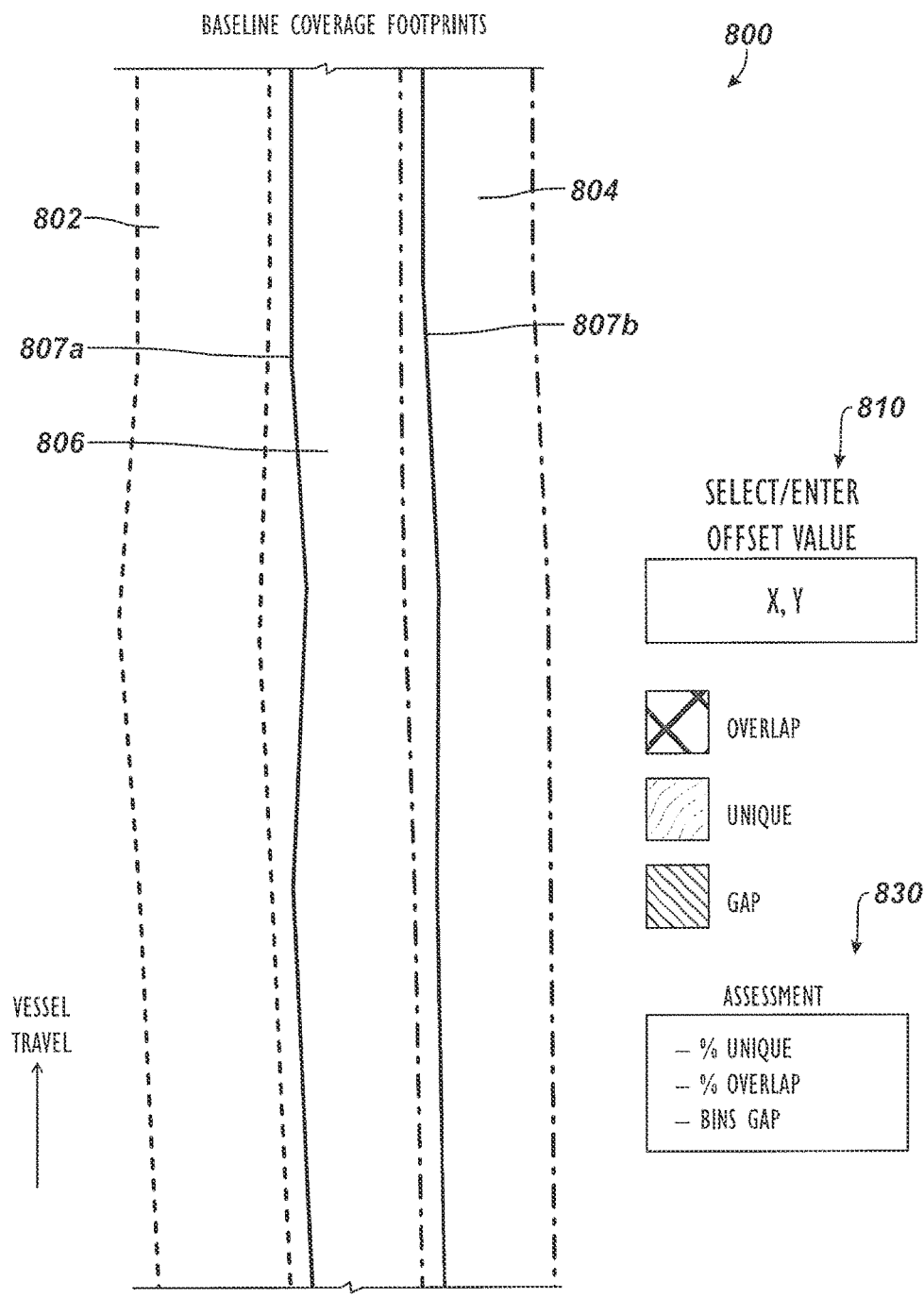
FIGS. 10A-10D illustrate representations of footprints for survey lines analysis by the process of FIG. 9.

As shown in FIG. 10A, for example, footprints 800 are displayed for survey lines as planned for baseline data of an area. Only a portion of the footprints 800 are illustrated, and it will be understood that the footprints 800 may extend a considerable distance and may or may not be relatively straight. These footprints 800 can be viewed, manipulated, and the like using the disclosed system as disclosed herein.

As noted above, the CMP lines 807a-b for the outer streamers of the spread (not shown) at a specified offset are traced as the baseline footprints 800 for the baseline survey lines 802, 804, 806 that have been acquired. These footprints 802, 804, 806 are generated and shown for a given offset value, which may be the same or different than a current offset value 810.

Figure 10B:
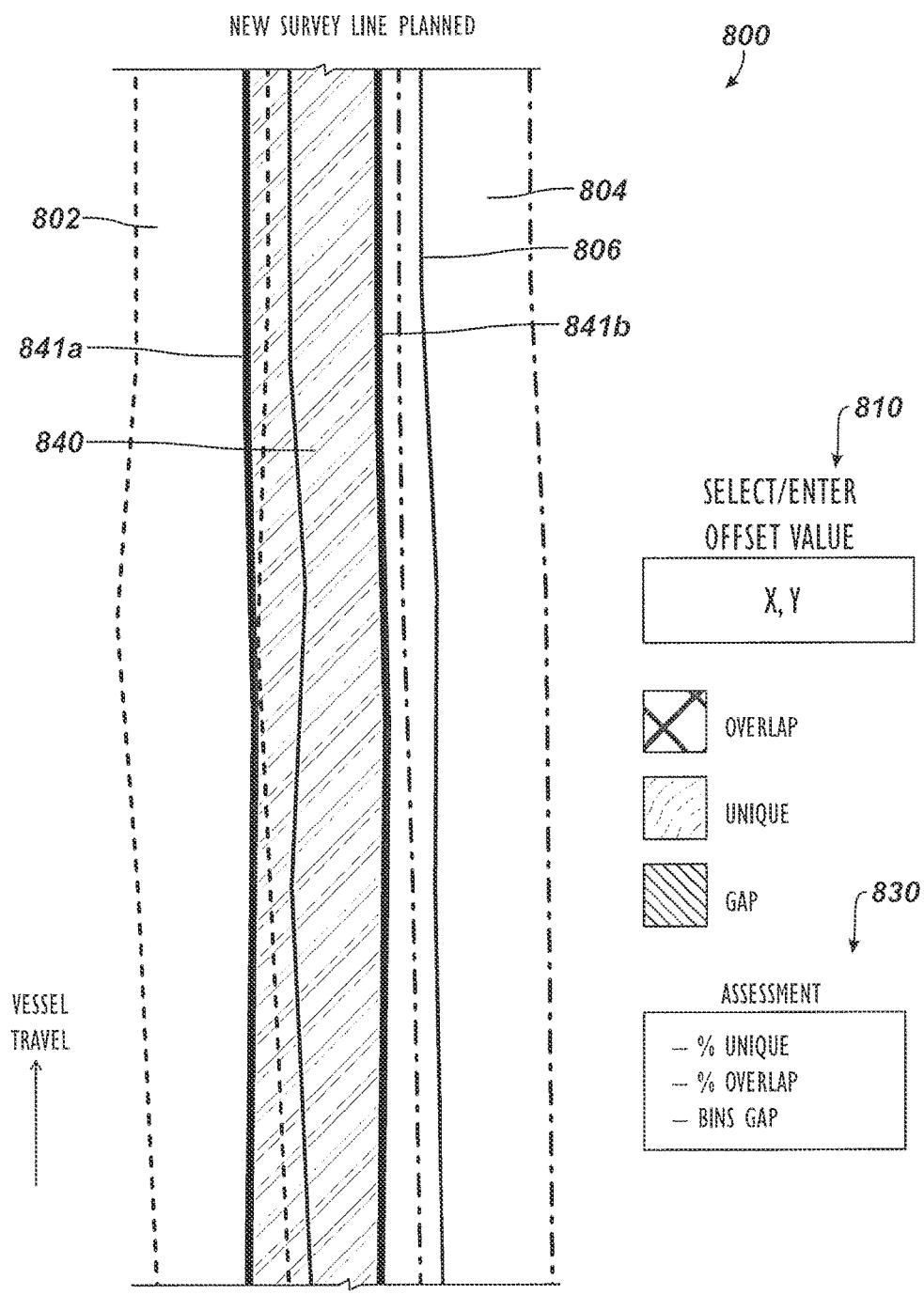

As then shown in FIG. 10B, a footprint 840 for a candidate line is planned under the current offset value 810 so that the CMP lines 841a-b of the outer streamers are traced based on the selected offset 810 and observed/predicted conditions (e.g., ocean current). The new candidate line may be used to infill data, to replace one of the baseline survey's lines (e.g., 840), or to provide 4D seismic data.

Figure 10C:
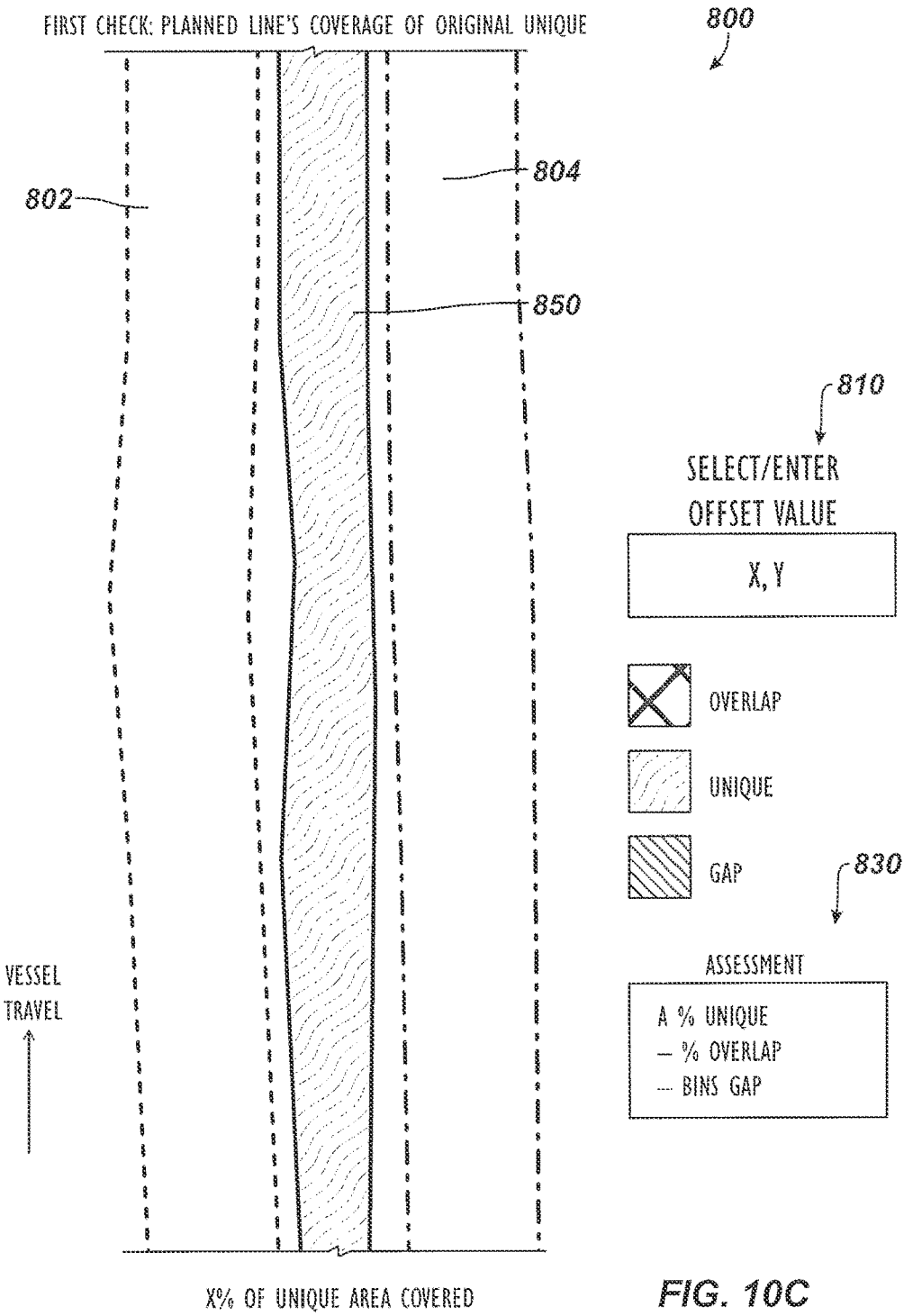

In a first pass of the analysis as shown in FIG. 10C, the predicted footprint 840 is compared with the unique coverage (or repeatability attribute) obtained by the underlying line 806 in the baseline survey. As shown, a calculation is made of the overlapping binned attribute (e.g., coverage) 850 that the new footprint (840) overlaps of the binned attribute of the original line's footprint (806). The calculation can be provided as a statistical value (e.g., percentage) or other metric 830 of unique area to be covered by both the new footprint (840) and the original baseline footprint (806).

Figure 10D:
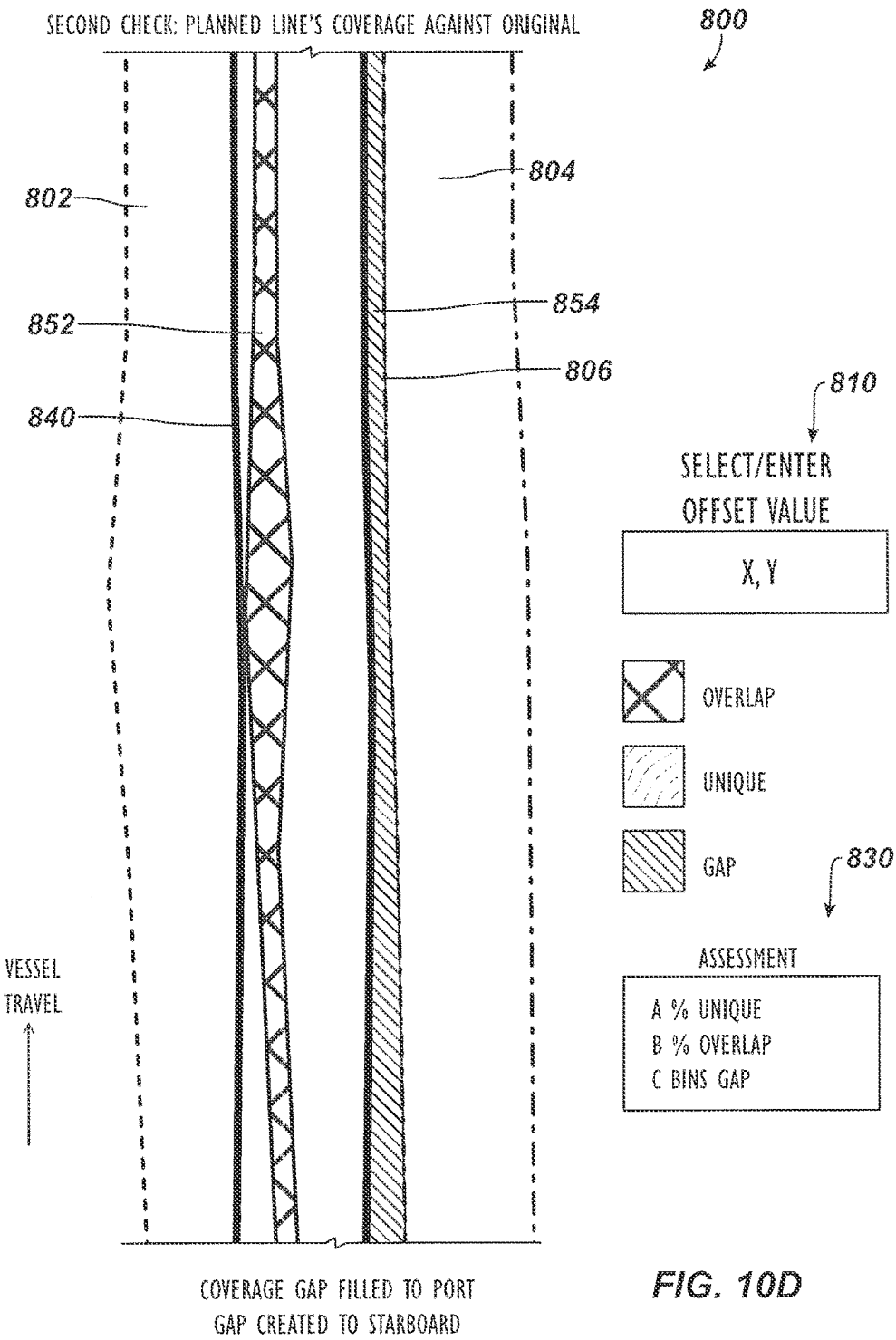

In a subsequent pass of the analysis as shown in FIG. 10D, the binned attribute (e.g., coverage) of the predicted footprint 840 is compared with the adjacent line's footprints 802, 804, which can be baseline survey lines. With this comparison, the gap filled 852 and the gap unfilled 854 by the binned attribute of the predicted footprint 840 is calculated and provided in the metrics 830. In this example, the binned attribute of the gap filled 852 is to the port, while the gap left 854 is to starboard. As with other quantities, the metrics for the gap filled 852 can be represented by statistics (e.g., percentages of binned attribute or coverage), and the gap unfilled 854 can be represented in terms of bins.

As these visual representations show, the analysis of the footprints' binned attribute for lines of a survey can provide quantifiable metrics and visual depictions for users and/or the system to assess and plan survey operations, such as which planned or candidate line to use during the survey, the reliability of data obtained, etc.

As disclosed above in the process of FIGS. 6 and 9, it is possible to get metrics (e.g., statistics) on the new data that is predicted to be achieved by each possible candidate line before a particular line is chosen to be used. This provides the user and the system with these metrics during the line selection process. These metrics are more accurate than what is currently provided, and the visualization of these metrics is also intuitive. Overall, the user and the system can more accurately choose the best candidate line for acquiring at the time, which can improve the efficiency and data quality of survey acquisition.

The user and the system can make a decision based on predicted data (e.g., expected coverage represented by the offset footprint), rather than just a predicted feather value that may not always reflect the predicted data. It is also possible for the process to provide the user or the system with the best possible time to shoot a particular line based on predicted data of the binned attribute (e.g., coverage).

I. Computer System

As noted previously with respect to FIG. 4A, various modules for a system can be used to perform the processes and techniques of the present disclosure. A variety of systems can be used to perform the disclosed processes and techniques. As a brief example, FIG. 4B shows a computer system 450 for seismic surveying conducted by at least one vessel with seismic equipment and operated by an operator. The system 450 includes at least one processing device (460), an input-output interface (470, 472), and a database (480, 482), among other possible elements.

The computer system 450 may be implemented at a seismic vessel. Alternatively, the computer system 450 may be a centralized or remote computer system configured to manage operations of a plurality of vessels, such as used in a multi-vessel survey.

As illustrated in FIG. 4B, the computer system 450 can include one or more processors 460, input/output devices 470, a communications interface 472, storage 480, and memory 482 connected via a communication bus 452.

The input/output devices 470 may include input devices such as a mouse, keyboard, touchscreens, and the like, and output devices such as CRT monitors, LCD displays, tablet computers, and the like. Storage device 480 stores application programs and data for use by the computer system 450. Typical storage devices include hard-disk drives, flash memory devices, optical media, network and virtual storage devices, and the like. The communications interface 472 may connect the computer system 450 to any kind of data communications network, including either wired networks, wireless networks, or a combination thereof.

The memory 482 can be a random access memory sufficiently large to hold the necessary programming and data structures of the disclosed subject matter. While memory 482 is shown as a single entity, it should be understood that memory 482 may in fact comprise a plurality of modules, and that memory 482 may exist at multiple levels, from high speed registers and caches to lower speed but larger DRAM chips.

Illustratively, the memory 482 contains an operating system 484. Well known examples of operating systems include the Windows® operating system, distributions of the Linux® operating system, and IBM's AIX and OS/2® operating systems, among others. More generally, any operating system supporting the functions disclosed herein may be used.

Memory 482 is also shown containing an operations tool 486 which, when executed by the processor 460, provides support for modelling sail lines; determining and predicting values, conditions, footprints, offsets, etc.; generating graphical user interfaces; facilitating user interaction with the user interfaces, and the like as described herein.

The database (e.g., storage 480) at least stores first information on an acquisition plan, second information on seismic data acquired along one or more acquired sail lines of the acquisition plan, and third information on an acquired footprint of the acquired seismic data of each of the one or more acquired sail lines. The at least one processing device (e.g., processors 460) is operatively coupled to the database (480, 482) and the input-output interface (470, 472). The at least one processing device (460) is configured to perform the seismic surveying disclosed herein.

Although the present disclosure refers to "lines" or tracks along which seismic data may be acquired, it will be understood that seismic data may be acquired in any type or shape of location, and, accordingly, the apparatuses and methods disclosed herein may be used to predict factors for any type or shape of location, model acquisition of seismic data in any type or shape of location, and so forth, with a "line" being representative of any of a number of types and shapes of locations in a marine-based seismic survey.

In addition, in methodologies directly or indirectly set forth herein, various steps and operations may be described in one possible order of operation, but those skilled in the art will recognize that the steps and operations may be rearranged, replaced, or eliminated without necessarily departing from the spirit and scope of the disclosed embodiments.

For the sake of discussion, the description focuses primarily on seismic data acquired by vessel-towed streamers 110 in marine environments. However, as mentioned, the concepts described herein apply more generally to, for example, land-based systems, ocean bottom cable systems, and so forth. The foregoing description of preferred and other embodiments is not intended to limit or restrict the scope or applicability of the inventive concepts conceived of by the Applicants. It will be appreciated with the benefit of the present disclosure that features described above in accordance with any embodiment or aspect of the disclosed subject matter can be utilized, either alone or in combination, with any other described feature, in any other embodiment or aspect of the disclosed subject matter.

As will be appreciated, teachings of the present disclosure can be implemented in digital electronic circuitry, computer hardware, computer firmware, computer software, or any combination thereof. Teachings of the present disclosure can be implemented in a computer program product tangibly embodied in a machine-readable storage device for execution by a programmable processor so that the programmable processor executing program instructions can perform functions of the present disclosure. The teachings of the present disclosure can be implemented advantageously in one or more computer programs that are executable on a programmable system including at least one programmable processor coupled to receive data and instructions from, and to transmit data and instructions to, a data storage system, at least one input device, and at least one output device. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A seismic surveying method, comprising:
   obtaining developed data related to acquisition of seismic data acquired by sailing at least one vessel towing streamers on a streamer spread along one or more developed sail lines of an acquisition plan, each of the developed sail lines having a developed footprint of the developed data, each of the developed footprints tracing common midpoints lines of the seismic acquisition of outer ones of the streamers on the streamer spread towed by the at least one vessel;
   predicting a first candidate footprint for acquiring first candidate data along a first candidate sail line adjacent one or more of the one or more developed sail lines, each of the first candidate footprints tracing candidate common midpoints lines at at least one offset of outer ones of the streamers on the streamer spread towed by the at least one vessel;
   comparing the first candidate footprint with respect to the adjacent one or more developed footprints;
   quantifying the comparison for an operator in terms of overlap, gap, and unique acquisition between the first candidate footprint with respect to the adjacent one or more developed footprints to maximize coverage;
   receiving an instruction from the operator for sailing the at least one vessel based on the quantified comparison; and
   acquiring seismic data by sailing the at least one vessel with the streamer spread in accordance with the instruction received.

2. The method of claim 1, wherein predicting the first candidate footprint comprises: determining at least one common midpoint footprint for the first candidate footprint along the first candidate sail line and determining the at least one offset for the at least one predicted common midpoint footprint.

3. The method of claim 2, wherein the at least one offset comprises an in-line offset, a cross-line offset, and/or a radial offset.

4. The method of claim 1, wherein predicting the first candidate footprint comprises defining the first candidate footprint by the common midpoint lines, at the at least one offset, of the streamer spread of seismic equipment towed by the at least one vessel under observed and/or predicted conditions.

5. The method of claim 1, wherein predicting comprises modeling acquisition of the first candidate data along the first candidate sail line based on at least one factor impacting the acquisition.

6. The method of claim 5, wherein the at least one factor comprises one or more of: environmental information, weather information, sea current information, acquisition geometry, feather, offset, obstruction, operational restriction, observed condition, and predicted condition.

7. The method of claim 1, wherein the first candidate sail line comprises a planned sail line in the acquisition plan, an infill sail line, a new sail line added to the acquisition plan, or a sail line in the acquisition plan of a 4-D survey of an existing baseline survey.

8. The method of claim 1, wherein comparing comprises spatially displaying first information representative of the one or more developed footprints and second information representative of the first candidate footprint.

9. The method of claim 1, wherein comparing comprises determining the overlap of at least one attribute between the developed data in the one or more developed footprints and the first candidate data in the first candidate footprint.

10. The method of claim 1, wherein comparing comprises determining the gap of at least one attribute between the developed data in the one or more developed footprints and the first candidate data in the first candidate footprint.

11. The method of claim 1, wherein comparing comprises determining the unique acquisition of at least one attribute of the first candidate data in the first candidate footprint that is unique compared to the developed seismic data in the one or more developed footprints.

12. The method of claim 11, wherein the at least one attribute comprises an area of a bin grid having an extent of seismic data, a coverage of a bin grid, quality control information, repeatability, a Root Mean Square (RMS) of a seismic signal, and a RMS of noise.

13. The method of claim 1, wherein quantifying the comparison comprises generating one or more metrics on at least one attribute between the first candidate footprint with respect to the adjacent one or more developed footprints.

14. The method of claim 13, wherein comparing and quantifying comprises tracing the first candidate footprint with respect to the adjacent one or more developed footprints in a visual display; spatially displaying the overlap, the gap, and the unique acquisition as an outline trace; and incorporating the one or more metrics on the at least one attribute in the visual display.

15. The method of claim 14, wherein the one or more metrics comprises a statistic on the at least one attribute.

16. The method of claim 1, wherein, before receiving the instruction, the method comprises:
predicting at least one second candidate footprint for acquiring second candidate data along at least one second candidate sail line relative to the adjacent one or more developed sail lines;
comparing the at least one second candidate footprint with respect to the adjacent one or more developed footprints; and
quantifying the comparison for the operator.

17. The method of claim 16, wherein predicting the at least one second candidate footprint comprises using the at least one offset used for the first candidate footprint.

18. The method of claim 1, wherein the operator is a user, an automated system, or both.

19. The method of claim 1, wherein the developed data related to the acquisition of the seismic data acquired by sailing along the one or more developed sail lines of the acquisition plan further comprises data that is one or more of stored, pre-existing, baseline, modeled, predicted, planned, generated, gathered, acquired, processed, and simulated.

20. The method of claim 1, wherein obtaining the developed data further comprises at least one of:
sailing the at least one vessel according to the acquisition plan and gathering seismic data with seismic equipment for the developed data;
planning the one or more developed sail lines for the acquisition plan and modeling the developed footprint in the developed data for the one or more planned sail lines;
predicting the one or more developed sail lines for the acquisition plan and modeling the developed footprint in the developed data for the one or more predicted sail lines;
accessing the developed data from storage; and
accessing the developed data from an existing baseline survey.

21. A programmable storage device having program instructions stored thereon for causing a programmable control device to perform a seismic surveying method of a subsurface volume according to claim 1.

22. The method of claim 1, wherein predicting the first candidate footprint comprises using the predicted first candidate footprint to infill missing data; and wherein quantifying the comparison to maximize the coverage comprising maximizing the unique acquisition of the first candidate footprint used to infill the missing data and reducing the overlap and the gap of the first candidate footprint relative to the adjacent one or more developed footprints.

23. The method of claim 1, wherein predicting the first candidate footprint comprises using the predicted first candidate footprint to replace the developed data of one of the developed footprints; and wherein quantifying the comparison to maximize the coverage comprising maximizing the unique acquisition of the first candidate footprint used to replace the developed data of the one developed footprint and reducing the overlap and the gap relative to the other developed footprints.

24. The method of claim 1, wherein predicting the first candidate footprint comprises using the predicted first candidate footprint to provide 4-D seismic data of one of the developed footprints; and wherein quantifying the comparison to maximize the coverage comprises maximizing repeated coverage of the first candidate footprint for the one developed footprint.

25. A seismic surveying method, comprising:
obtaining developed data related to acquisition of seismic data acquired with at least one vessel towing streamers on a streamer spread of seismic equipment at one or more developed locations of an acquisition plan, each of the developed locations having a developed footprint of the developed data, each of the developed footprints tracing common midpoints lines of the seismic acquisition of outer streamers on the streamer spread towed by the at least one vessel;
predicting a first candidate footprint for acquiring first candidate data at a first candidate location adjacent one or more of the one or more developed locations, each of the first candidate footprints tracing candidate common midpoints lines at at least one offset of outer streamers on the streamer spread towed by the at least one vessel;
comparing the first candidate footprint with respect to the adjacent one or more developed footprints;
quantifying the comparison for an operator in terms of overlap, gap, and unique acquisition between the first candidate footprint with respect to the adjacent one or more developed footprints to maximize coverage;
receiving an instruction from the operator for operating the seismic equipment based on the quantified comparison; and
acquiring seismic data by sailing the at least one vessel with the streamer spread in accordance with the instruction received.

26. A system for seismic surveying, the system comprising:

an input-output interface;
seismic equipment having streamers of a streamer spread for towing by at least one vessel;
a database at least storing first information on an acquisition plan, second information on developed data related to acquisition of seismic data acquired with the streamers on the streamer spread of seismic equipment at one or more developed locations of the acquisition plan, and third information on a developed footprint of the developed data of each of the one or more developed locations, each of the developed footprints tracing common midpoints lines of outer ones of the streamers on the streamer spread towed by the at least one vessel; and
at least one processing device operatively coupled to the database and the input-output interface, the at least one processing device configured to:
  predict a first candidate footprint for acquiring first candidate data at a first candidate location adjacent one or more of the one or more developed locations, the first candidate footprint tracing candidate common midpoints lines at at least one offset of outer ones of the streamers on the streamer spread towed by the at least one vessel;
  compare the first candidate footprint with respect to the adjacent one or more developed footprints;
  quantify the comparison for an operator via the input-output interface in terms of overlap, gap, and unique acquisition between the first candidate footprint with respect to the adjacent one or more developed footprints to maximize coverage; and
  receive an instruction from the operator via the input-output interface for operating the seismic equipment based on the quantified comparison,
wherein seismic data is acquired by sailing the at least one vessel with the streamer spread in accordance with the instruction received.

* * * * *